US012773852B2

(12) United States Patent
Marzano et al.

(10) Patent No.: US 12,773,852 B2
(45) Date of Patent: Oct. 27, 2026

(54) CONTINUOUS INKJET PRINTER

(71) Applicant: Dover Europe Sàrl, Vernier (FR)

(72) Inventors: Thomas Marzano, Romans-sur-Isère (FR); Francis Pourtier, Charmes sur Rhône (FR); Matthieu Bardin, Chatuzange le Goubet (FR); Vincent Audouard, Toulaud (FR); Stéphane Ruel, Montélier (FR); Camille Gobin, Lyons (FR); Jean François Abadie, Bourg de Péage (FR); Philippe Marcarie, Guilherand Granges (FR)

(73) Assignee: Dover Europe Sàrl, Vernier (CH)

( * ) Notice: Subject to any disclaimer, the term of this patent is extended or adjusted under 35 U.S.C. 154(b) by 311 days.

(21) Appl. No.: 18/270,620

(22) PCT Filed: Dec. 30, 2021

(86) PCT No.: PCT/EP2021/087878
§ 371 (c)(1),
(2) Date: Jun. 30, 2023

(87) PCT Pub. No.: WO2022/144430
PCT Pub. Date: Jul. 7, 2022

(65) Prior Publication Data

US 2024/0227410 A1 Jul. 11, 2024

(30) Foreign Application Priority Data

Dec. 30, 2020 (EP) .................................... 20306711
Dec. 30, 2020 (EP) .................................... 20306712
(Continued)

(51) Int. Cl.
*B41J 2/175* (2006.01)
*B41J 29/02* (2006.01)
*B41J 2/17* (2006.01)

(52) U.S. Cl.
CPC ....... *B41J 2/17596* (2013.01); *B41J 2/17563* (2013.01); *B41J 29/02* (2013.01); *B41J 2/1735* (2024.05)

(58) Field of Classification Search
CPC .... B41J 2/17596; B41J 2/17563; B41J 29/02; B41J 2/1735; B41J 29/13; B41J 29/377
See application file for complete search history.

(56) References Cited

U.S. PATENT DOCUMENTS 6,874,876 B2 4/2005 Ishizawa et al.
7,393,088 B2 7/2008 Sasaki
(Continued)

FOREIGN PATENT DOCUMENTS

CN 104070815 A 10/2014
CN 205523072 U 8/2016
(Continued)

OTHER PUBLICATIONS

European Search Report in European Appl. No. 20306711, dated Jun. 11, 2021, 1 page.
(Continued)

*Primary Examiner* — Justin Seo
(74) *Attorney, Agent, or Firm* — Fish & Richardson P.C.

(57) ABSTRACT

A continuous inkjet printer includes a cabinet having a first side and a second side. Components of the continuous inkjet printer that are to be accessed by a printer technician are located in the first side of the cabinet. Components of the continuous inkjet printer that are to be accessed by a printer user being located in the second side of the cabinet.

20 Claims, 18 Drawing Sheets

(30) Foreign Application Priority Data

Dec. 30, 2020 (EP) .................................... 20306713
Nov. 29, 2021 (EP) .................................... 21306659

(56) References Cited

U.S. PATENT DOCUMENTS

| | | | |
|---|---|---|---|
| 7,997,706 | B2 | 8/2011 | Silverbrook et al. |
| 10,150,300 | B2 | 12/2018 | Ribiero et al. |
| 10,189,268 | B2 | 1/2019 | Berbiguier et al. |
| 10,195,865 | B2 | 2/2019 | Pourtier |
| 10,399,348 | B2 | 9/2019 | Smith et al. |
| 10,421,303 | B2 | 9/2019 | Stamp et al. |
| 10,442,204 | B2 | 10/2019 | De Saint et al. |
| 11,001,070 | B2 | 5/2021 | Nishimura |
| 11,381,039 | B2 | 7/2022 | Hsiao et al. |
| 2005/0157095 | A1 | 7/2005 | Silverbrook et al. |
| 2005/0248608 | A1 | 11/2005 | Devivo et al. |
| 2007/0091152 | A1 | 4/2007 | Rademakers et al. |
| 2008/0231661 | A1 | 9/2008 | Brown et al. |
| 2009/0122121 | A1 | 5/2009 | Kawasaki et al. |
| 2009/0295884 | A1 | 12/2009 | Nishimori |
| 2010/0220128 | A1 | 9/2010 | Zaba et al. |
| 2010/0238243 | A1 | 9/2010 | Tomlin et al. |
| 2011/0043583 | A1 | 2/2011 | Silverbrook et al. |
| 2011/0085009 | A1 | 4/2011 | Tomlin et al. |
| 2012/0274704 | A1 | 11/2012 | Silverbrook |
| 2012/0306949 | A1 | 12/2012 | Rolland |
| 2013/0286077 | A1 | 10/2013 | Morgan et al. |
| 2014/0210901 | A1 | 7/2014 | Ohashi et al. |
| 2015/0258805 | A1 | 9/2015 | Stamp et al. |
| 2016/0039216 | A1 | 2/2016 | Ribiero et al. |
| 2017/0015104 | A1 | 1/2017 | Chalamet et al. |
| 2018/0194150 | A1 | 7/2018 | Smith et al. |
| 2018/0281434 | A1 | 10/2018 | Shimizu |
| 2019/0122121 | A1 | 4/2019 | Yu |
| 2019/0143704 | A1 | 5/2019 | Smith |
| 2020/0086642 | A1 | 3/2020 | Eto |
| 2022/0203687 | A1 | 6/2022 | Pourtier et al. |
| 2022/0203689 | A1 | 6/2022 | Bardin et al. |

FOREIGN PATENT DOCUMENTS

| | | |
|---|---|---|
| CN | 107921782 A | 4/2018 |
| CN | 111376605 A | 7/2020 |
| EP | 1534523 | 6/2005 |
| EP | 2484527 | 8/2012 |
| EP | 2978606 | 2/2016 |
| EP | 3093144 | 11/2016 |
| EP | 3098075 | 11/2016 |
| EP | 3210786 | 8/2017 |
| EP | 3466697 | 4/2019 |
| EP | 3587122 | 1/2020 |
| EP | 3587124 | 1/2020 |
| EP | 3284601 | 11/2021 |
| EP | 4023444 | 7/2022 |
| EP | 4023445 | 7/2022 |
| EP | 4023446 | 7/2022 |
| EP | 4186705 | 5/2023 |
| GB | 2447919 | 10/2008 |
| WO | WO 2009/049140 | 4/2009 |
| WO | WO 2012/038520 | 3/2012 |
| WO | WO 2015/187839 | 12/2015 |
| WO | WO 2016/024973 | 2/2016 |
| WO | WO 2016/205168 | 12/2016 |
| WO | WO 2016/205173 | 12/2016 |
| WO | WO 2020/113280 | 6/2020 |
| WO | WO 2022/237983 | 11/2022 |

OTHER PUBLICATIONS

European Search Report in European Appl. No. 20306712, dated Jun. 11, 2021, 1 page.
European Search Report in European Appl. No. 20306,13, dated Jun. 3, 2021, 1 page.
European Search Report in European Appl. No. 21306659, dated May 2, 2022, 1 page.
International Preliminary Report on Patentability in International Appln. No. PCT/EP2021/087878, mailed on Jul. 13, 2023, 8 pages.
International Search Report and Written Opinion in International Appln. No. PCT/EP2021/087878, mailed on Apr. 13, 2022, 14 pages.
Chinese Office Action in Chinese Appln. No. 202180094668.5, mailed on Jul. 2, 2025, with English Translation, 21 pages.
Chinese Office Action in Chinese Appln. No. 202180094668.5, mailed on Feb. 26, 2026, with English Translation, 12 pages.

CONTINUOUS INKJET PRINTER

CROSS-REFERENCE TO RELATED APPLICATIONS

This application claims priority to European Patent Application EP20306711.1, filed on Dec. 30, 2020, the entire contents of which are hereby incorporated by reference. This application also claims priority to European Patent Application EP20306713.7, filed on Dec. 30, 2020, to European Patent Application EP20306712.9, filed on Dec. 30, 2020, to European Patent Application EP21306659.0, filed on Nov. 29, 2021, and to International Patent Application PCT/EP2021/062725, filed on May 12, 2021, the entire contents of which are hereby incorporated by reference.

BACKGROUND

This specification relates to systems and techniques relating to continuous inkjet (CIJ) printers.

CIJ printers are well known in the field of industrial coding and labelling of various products, for example to mark barcodes or expiry dates on food items directly on the production line and at a fast production rate. This type of printer is also found in some fields of design in which use is made of the graphic printing possibilities of the technology.

SUMMARY

This specification describes technologies relating to systems and techniques relating to CIJ printers.

In general, one or more aspects of the subject matter described in this specification can be embodied in one or more systems that include: a continuous inkjet printer can include a cabinet having a first side and a second side; components of the continuous inkjet printer that are to be accessed by a printer technician can be located in the first side of the cabinet; components of the continuous inkjet printer that are to be accessed by a printer user can be located in the second side of the cabinet.

These and other embodiments can optionally include one or more of the following features. The components of the continuous inkjet printer that are located in the second side of the cabinet can include one or more single-block or whole-block removable assemblies. The one or more single-block or whole-block removable assemblies can include an ink pump module, a filter module, and an ink recovery module. The one or more single-block or whole-block removable assemblies can further include a multifunctional hydraulic module. The components of the continuous inkjet printer that are located in the first side of the cabinet can include a main ink reservoir. Each of the one or more single-block or whole-block removable assemblies can be removable using a single type of tool.

The components of the continuous inkjet printer that are located in the second side of the cabinet can further include an ink cartridge and a solvent cartridge. The continuous inkjet printer can include a user interface display device, and a controller configured to notify a user of a needed maintenance task for at least one of the components located in the second side of the cabinet, and can present on the user interface display device instructions to the user showing how to perform the needed maintenance task.

Each of the components of the continuous inkjet printer that are located in the second side of the cabinet can include an identifier. The controller can be configured to confirm an identity and compatibility of a component based on information obtained from the identifier of the component. The second side of the cabinet can be a front side of the cabinet. The first side of the cabinet can a back side of the cabinet.

The continuous inkjet printer can further include a first damper positioned along an ink circuit of the continuous inkjet printer; and a removable filter module including a second damper positioned along the ink circuit of the continuous inkjet printer; the first damper can be external to the removable filter module, and the first and second dampers can be selected to cooperate with each other to damp pressure variations of ink in the ink circuit during operation of the continuous inkjet printer.

The removable filter module can include a single-block or whole-block removable assembly forming a component located in the second side of the continuous inkjet printer. The removable filter module can include a first filter and a second filter contained in a housing of the removable filter module. The second damper can be a floating damper placed above the first filter. The floating damper can be held in place between the first filter and an interior surface of the housing of the removable filter module. The second filter can be a grid filter. The first filter can be a main filter. The removable filter module can comprise a third filter connected between an outlet of the main filter and a fluid outlet of the removable filter module. The first damper can be placed on a main pressure line of the ink circuit. The second damper can be placed on a jet generation line of the ink circuit.

The continuous inkjet printer can include a removable hydraulic module including two or more components of the continuous inkjet printer that are most active during operation of the continuous inkjet printer and thus tend to wear out before other components of the continuous inkjet printer. The removable hydraulic module can include a retention tank or tray configured and arranged to collect liquid leaks. The two or more components can be a first pump for pumping ink from an ink source; a second pump for pumping solvent from a solvent source; and two or more valves configured and arranged to connect the first and second pumps with inlets and outlets of the removable hydraulic module to establish fluidic connection in the ink circuit of the continuous inkjet printer.

The removable hydraulic module can include a retention tank or tray configured and arranged to collect liquid leaks. The retention tank or tray can be integrally formed into a housing of the removable hydraulic module and can extend beneath each of the ink source and the solvent source when the removable hydraulic module is coupled with the continuous inkjet printer. The two or more valves can include five electrovalves. The removable hydraulic module can include a hydraulic manifold configured and arranged to connect hydraulic components of the removable hydraulic module in a compact manner; and a pressure sensor connected to the hydraulic manifold.

The continuous inkjet printer can include a temperature sensor; a hygrometry sensor; a condenser; and a controller configured to set a lower temperature limit for the condenser to maximize condensation of solvent vapor from a solvent currently being used in the continuous inkjet printer, while minimizing condensation of water vapor; the lower temperature limit can be set based on a temperature value measured by the temperature sensor and a humidity value measured by the hygrometry sensor.

Various embodiments of the subject matter described in this specification can be implemented to realize one or more of the following advantages. Some modules of the ink circuit can be removable and can be replaced by non-specialized operators during preventive and/or curative maintenance operations. The printer users can perform certain preventive and/or curative maintenance operations without delay. Non specialized users can perform maintenance operations and bring the printer back to operation without waiting for technical assistance from a specialized technician. Some modules can be assembled and disassembled by non-specialized users using a single type of tool common to all the modules. Users can manipulate the ink and solvent cartridges as well as the removable modules with a minimum exposure to the rest of hydraulic and electric components of the CIJ printer.

The same cabinet can be used to provide multiple versions of a printer by mixing and matching different versions of the modules. This allows a late stage customization of the printer. For instance, the desired modules can be selected during a customization step depending on the type of ink the printer is going to use, without impacting the production of the rest of the components of the printer or their installation in the printer cabinet.

Pressure variations or oscillations of the ink that can degrade print quality can be damped. Water condensation in the ink reservoir can be avoided. Solvent emissions can be reduced.

The details of one or more embodiments of the subject matter described in this specification are set forth in the accompanying drawings and the description below. Other features, aspects, and advantages of the invention(s) will become apparent from the description, the drawings, and the claims.

DETAILED DESCRIPTION

Figure 1A:
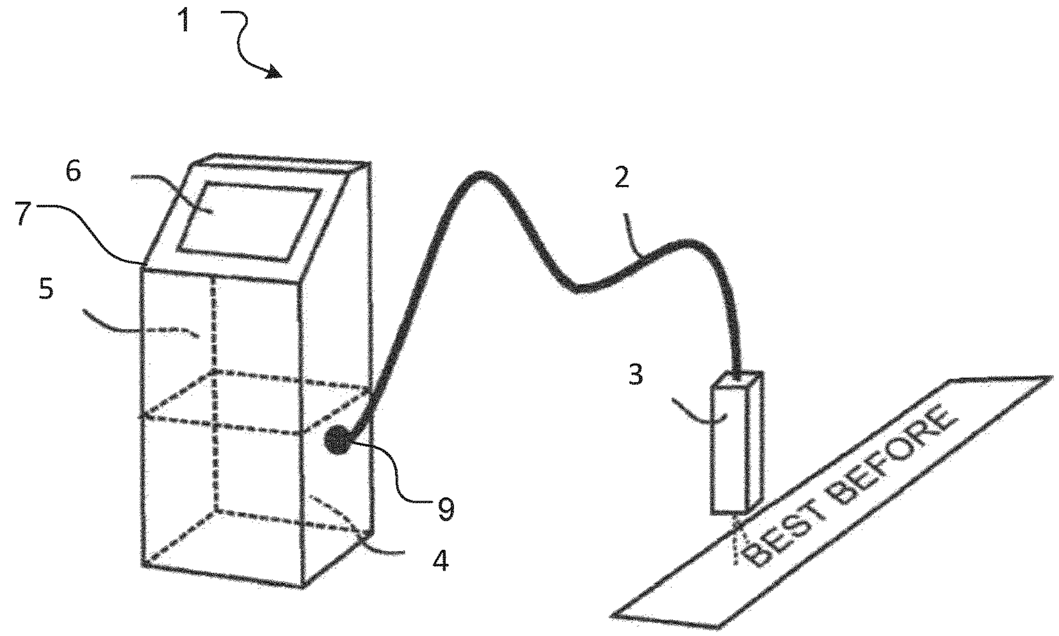
FIGS. 1A-1B show front and rear views of an example of a CIJ printer.

FIG. 1A shows an example of a CIJ printer system 1. Printer 1 has a printhead 3, generally offset from the body of the printer, and connected thereto by a flexible umbilical cable 2 grouping together the hydraulic and electrical connections required for operation of the printhead and imparting flexibility thereto which facilitates integration on a production line. Umbilical cable 2 is attached to the body of the printer through a connector 9. The body 7 of the printer, also called a console or cabinet, contains several subassemblies.

An ink circuit can be placed in the lower part 4 of the cabinet. The ink circuit allows firstly the supplying of ink to the head 3 at stable pressure and of adequate quality, and secondly the taking in charge of the jetted ink recovered from the head 3 that is not used for printing.

A controller 500 can be located in the upper part 5 of the cabinet. The controller 500 is capable of managing the sequencing of actions and of conducting processing to permit the actuation of the different functions of the ink circuit and the head 3.

Controller 500 also controls the display 6 and the user interface of the printer. To perform these functions, the upper part 5 of the cabinet hosts several processors or microcontrollers placed on electronic boards.

An interface 6 can include visualization components such as a display screen, and provides the operator with a control interface (e.g., a touch screen display) to set the printer in operation and to be informed of the functioning thereof.

In other words, the body 7 can include two sub-assemblies: at the top part 5 of the cabinet, the electronics, electrical supply and operator interface 6; and in the lower part 4 of the cabinet, an ink circuit supplying the head 3 with ink under pressure and providing a negative pressure for recovery of the ink not used by the head 3.

Figure 1B:
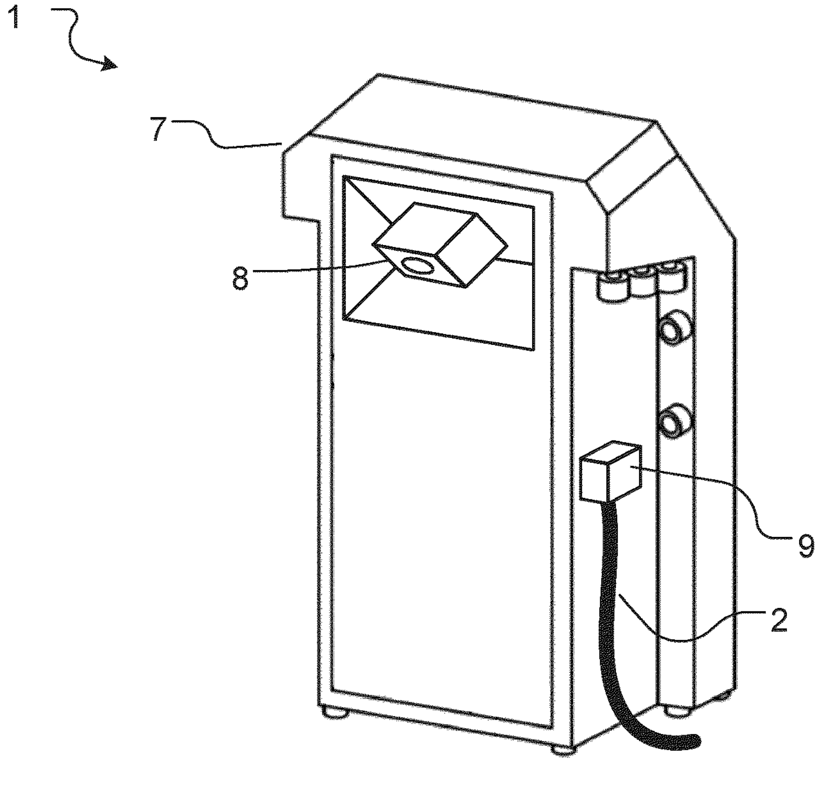

FIG. 1B shows the rear part of the body of the CIJ printer 1. In some configurations, the printer 1 can include an industrial interface or single-point connector 8 that can be used to install the CIJ printer. Connector 8 can also be attached to other areas of the body of printer 1, as long as it provides electric connection to printer 1. Advantageously, connector 8 can gather in a single interface all the electric connections needed to install the printer in a production line. For instance, connector 8 can be used to connect the printer to a computer or to external accessories or can also be used in a master/slave printer configuration. Using a single interface 8 for the electric connections enables a faster and more convenient set up and replacement of the printer in the production line compared to a configuration where several individual cables need to be connected.

In an example, the input/output configuration of connector 8 can be further configured via software.

Advantageously, connector 9 can be connected to the cabinet in different orientations. This allows umbilical 2 to extend from the cabinet in different orientations to adapt to the characteristics of the production line. For instance, connector 9 can be connected to the cabinet in five different orientations so that umbilical 2 can extend from the cabinet in four different orientations. For instance, umbilical 2 can extend from the top or from the bottom of connector 9 or from the left or from the right of connector 9 or extend orthogonally from the cabinet.

Figure 2A:
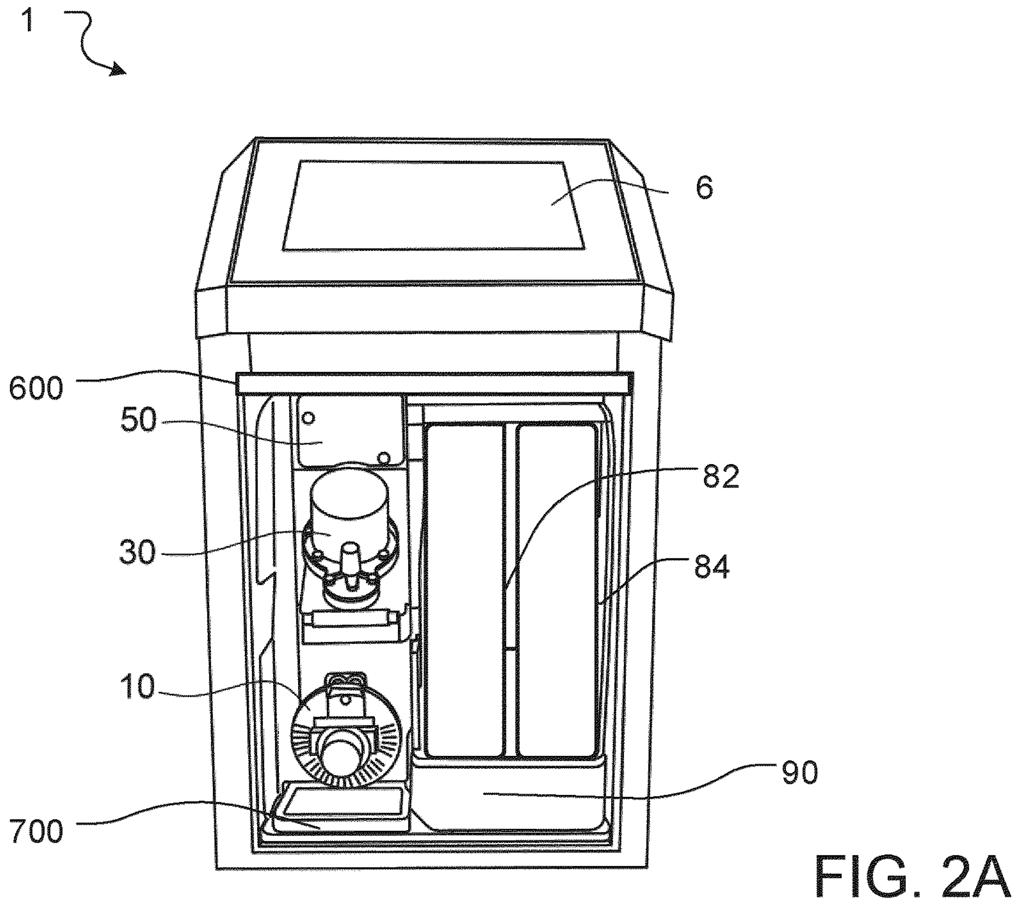
FIGS. 2A-2B show front and rear views of an example of the interior of a cabinet of a CIJ printer.
Figure 2B:
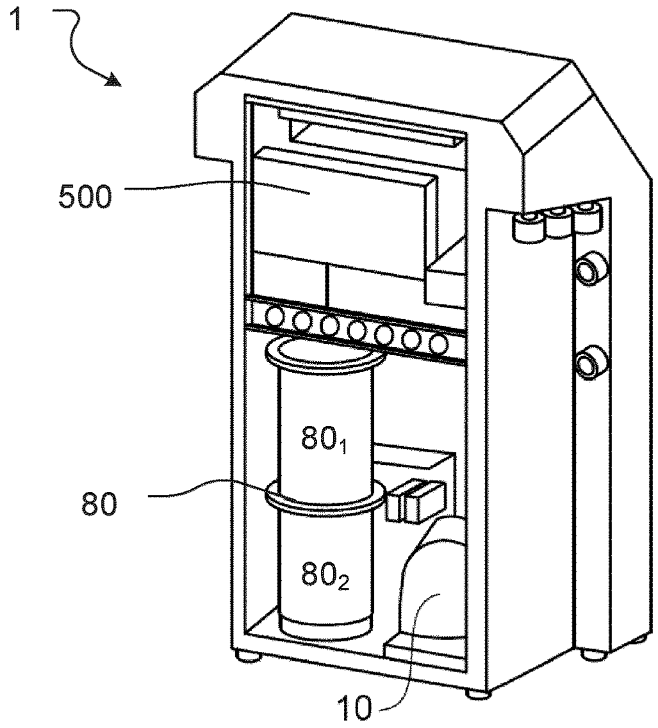

FIG. 2A-2B schematically show an example of a configuration of a CIJ cabinet according to some implementations. Advantageously, the cabinet 7 presents a modular structure. FIG. 2A shows the front part of the cabinet. A front door (not shown) gives access to the front part of the cabinet. The front part of the cabinet allows access to components of the ink circuit that can be readily removed or replaced. For example, the front part of the cabinet allows access to the ink cartridge 82, to the solvent cartridge 84, and to the air inlet filter 600 and air outlet filter 700. Advantageously, the front part of the cabinet also gives access to one or more single-block or whole-block removable assemblies 10, 30, 50, 90 corresponding to one or more modules containing fluid components of the ink circuit.

The whole-block removable assemblies can include a housing having at least one fluid inlet and at least one fluid outlet, and fluid connections, for example, ducts, to allow fluid to flow from the at least one fluid inlet to the fluid components in the modules and then to the at least one fluid outlet. For example, the whole-block assemblies can be one or more of a pump module 10, a filter module 30, a recovery module 50, and a multifunctional hydraulic module 90.

The whole-block removable assemblies can be independently removed or replaced without needing access to or affecting the functioning of the rest of the ink circuit. For example, they can correspond to modules of the ink circuit that can be replaced by non-specialized operators during preventive and/or curative maintenance operations.

This conveniently enables the printer users to perform certain preventive and/or curative maintenance operations without delay. Non specialized users can perform maintenance operations and bring the printer back to operation without waiting for technical assistance from a specialized technician.

For instance, the user can, from the front part of the CIJ printer, remove and/or replace the ink cartridge. For instance, the user can, from the front part of the CIJ printer, remove and/or replace the solvent cartridge. The user can also remove and/or replace the inlet air filter 600 and/or the outlet air filter 700. For instance, the user can, from the front part of the CIJ printer, remove and/or replace one or more of the pump module 10, the filter module 30, the recovery module 50, and the multifunctional hydraulic module 90.

For instance, one or more of the pump module 10, the filter module 30, the recovery module 50, and the multi-functional hydraulic module 90 can be assembled and dis-assembled by non-specialized users using a single type of tool common to all the modules. For instance, the tool can be a hex wrench. For instance, the tool can be a three millimeter hex wrench. Other types of tools common to all the modules can be used to assemble the modules. For instance, any type of screwdriver, such as a hexalobular internal drive or another type of star screwdriver can be used.

The printer interface can prompt the user to perform preventive and/or curative operations in the printer. For instance, the printer interface can prompt the user to change one or more of the pump module 10, the filter module 30, the recovery module 50, and the multifunctional hydraulic module 90 as well as the air inlet filter 600 and the air outlet filter 700.

The printer interface can guide the user during the removal and reconnection of any of the components that can be accessed from the front part of the printer, providing instructions to the user at every stage until the printer is operative again.

FIG. 2B illustrates the rear part of the cabinet. The rear part of the cabinet is at least partially separated from the front part of the cabinet. For instance, at least one internal wall placed inside the cabinet and substantially parallel to a front door (not shown) of the cabinet when the door is in a closed position separates the front and the rear parts of the cabinet.

The rear part of the cabinet allows access to components associated with more specialized preventive or curative maintenance operations which need to be performed by specialized operators.

For instance, controller 500 of the printer and connection boards can be accessed from the top rear part of the cabinet.

For instance, the main ink reservoir 80 can be accessed from the rear part. Ducts, valves and other pumps of the circuit (not shown) can also be accessed from the rear part of the cabinet to be serviced and repaired by trained operators. Trained operators can also change a printhead umbilical 2 from the rear part of the cabinet and access other components related to the functioning of the umbilical 2.

The main reservoir 80 can be of the type comprising two compartments as disclosed in EP 3466697, the upper compartment $\mathbf{80}_1$ for storing ink and the lower compartment $\mathbf{80}_2$ for storing solvent.

A motor 21 of the pump can also be accessed from the rear part of the cabinet. However, the pump module 10 as well as the other whole-block removable assemblies 30, 50, 90, are accessed from the front part as described below.

Figure 3A:
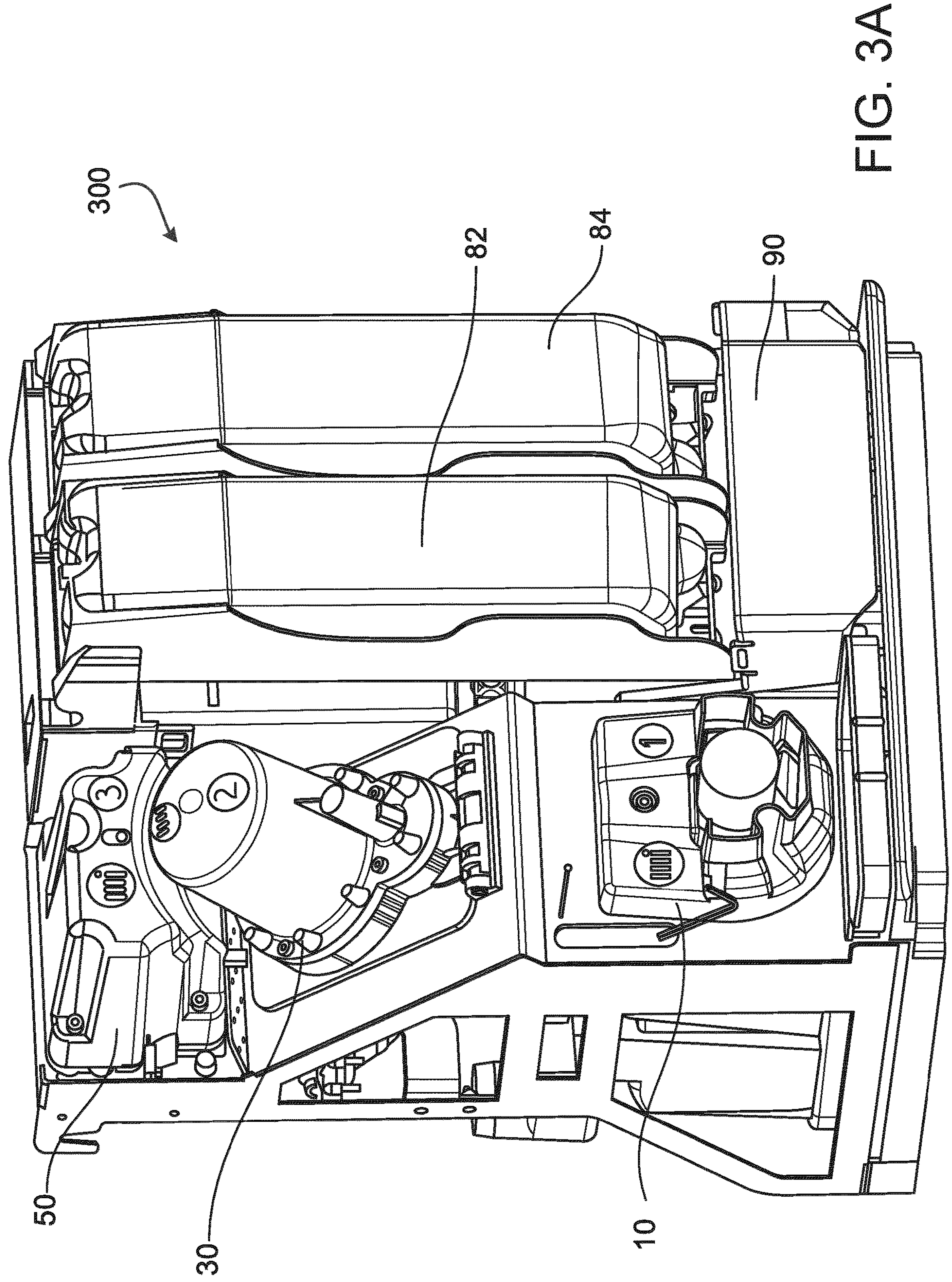
FIGS. 3A-3B show an example of a chassis for a cabinet of a CIJ printer.

FIG. 3A shows a front view of a chassis 300 that can be installed in a CIJ printer cabinet. Chassis 300 provides a wall structure to host the ink and solvent cartridges 82, 84 as well as one or more of a pump module 10, a filter module 30, a recovery module 50, and a multifunctional hydraulic module 90, and also block access to other parts of the printer 1 that the user should not access. For instance, when all the modules are in place, the components in the rear part of the cabinet cannot be accessed from the front part of the cabinet.

Chassis 300 contributes to the safe manipulation of the printer by non-specialized users. The wall structure of chassis 300 allows the users to manipulate the ink and solvent cartridges 82, 84 as well as any one of the removable modules with a minimum exposure to the rest of hydraulic and electric components of the CIJ printer 1.

Figure 3B:
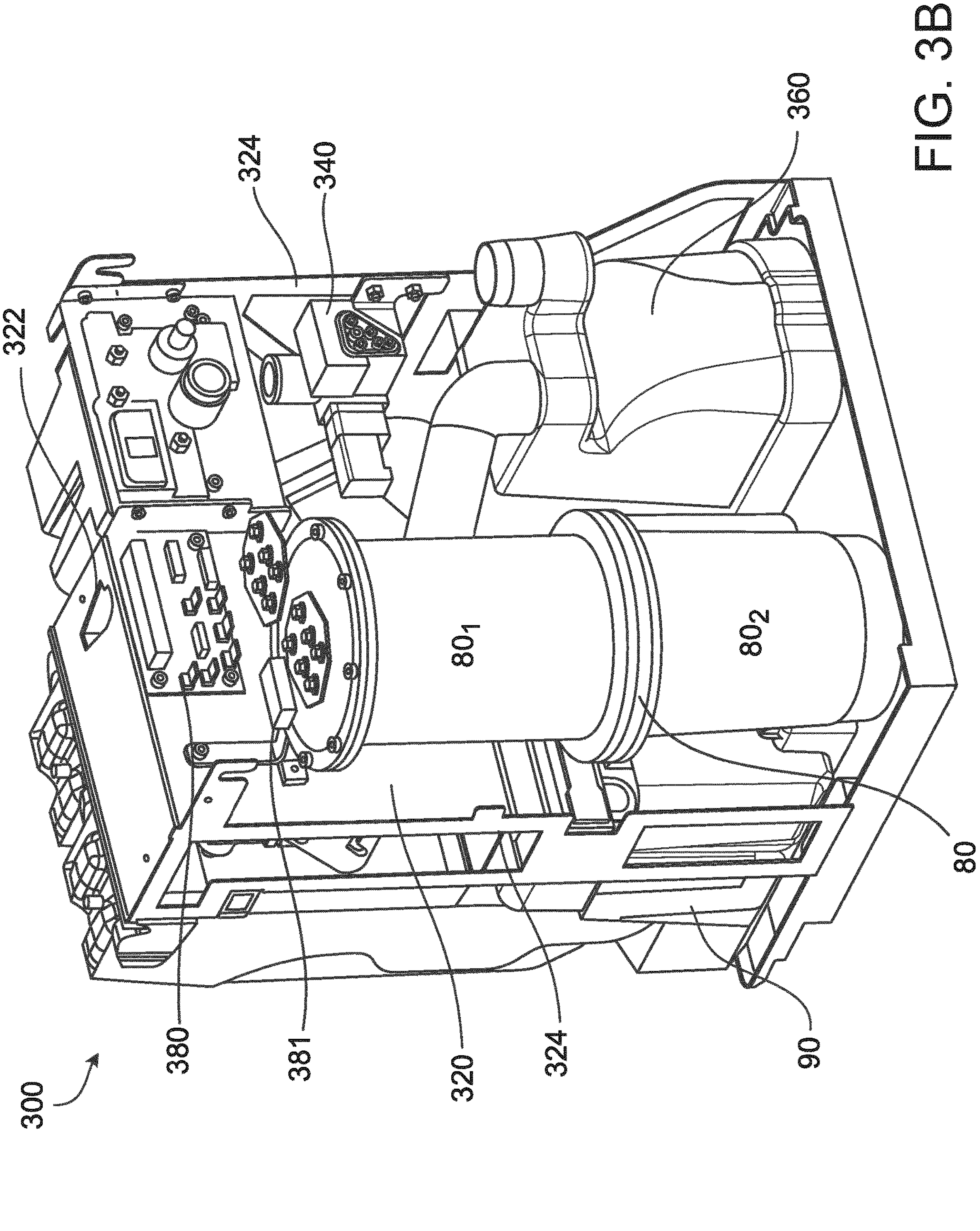

FIG. 3B shows a rear view of chassis 300. The back wall of chassis 300 provides an internal wall 320 that can extend partially along the cabinet and at least partially separates the front and the rear parts of the cabinet. The back wall can leave room in the bottom part of the cabinet to accommodate, for instance, a pump motor 21 and a pump fan enclosed by housing 360 as well as the rear part of the outlet air filter 700.

FIG. 3B also shows connection board 380 and connector 381 that provide electronic connection between the ink circuit and the controller 500 of the printer.

Trained operators can also change a printhead umbilical 2 and access other components related to the umbilical 2 that are hosted in umbilical module 340, such as, for instance, a pressure sensor and one or more electrovalves.

The back wall, as well as other walls forming the chassis can also present one or more openings, holes or slots 322 to improve air circulation in the cabinet and/or to host cables connecting the components in the lower part of the cabinet to the electronics in the upper part of the cabinet. Air can also flow along one or more junctions 324 of internal wall 320 to one or more of the lateral walls of the cabinet.

Further details regarding air flow management in the cabinet can be found in EP21306659.0, the entire contents of which are hereby incorporated by reference.

Figure 4A:
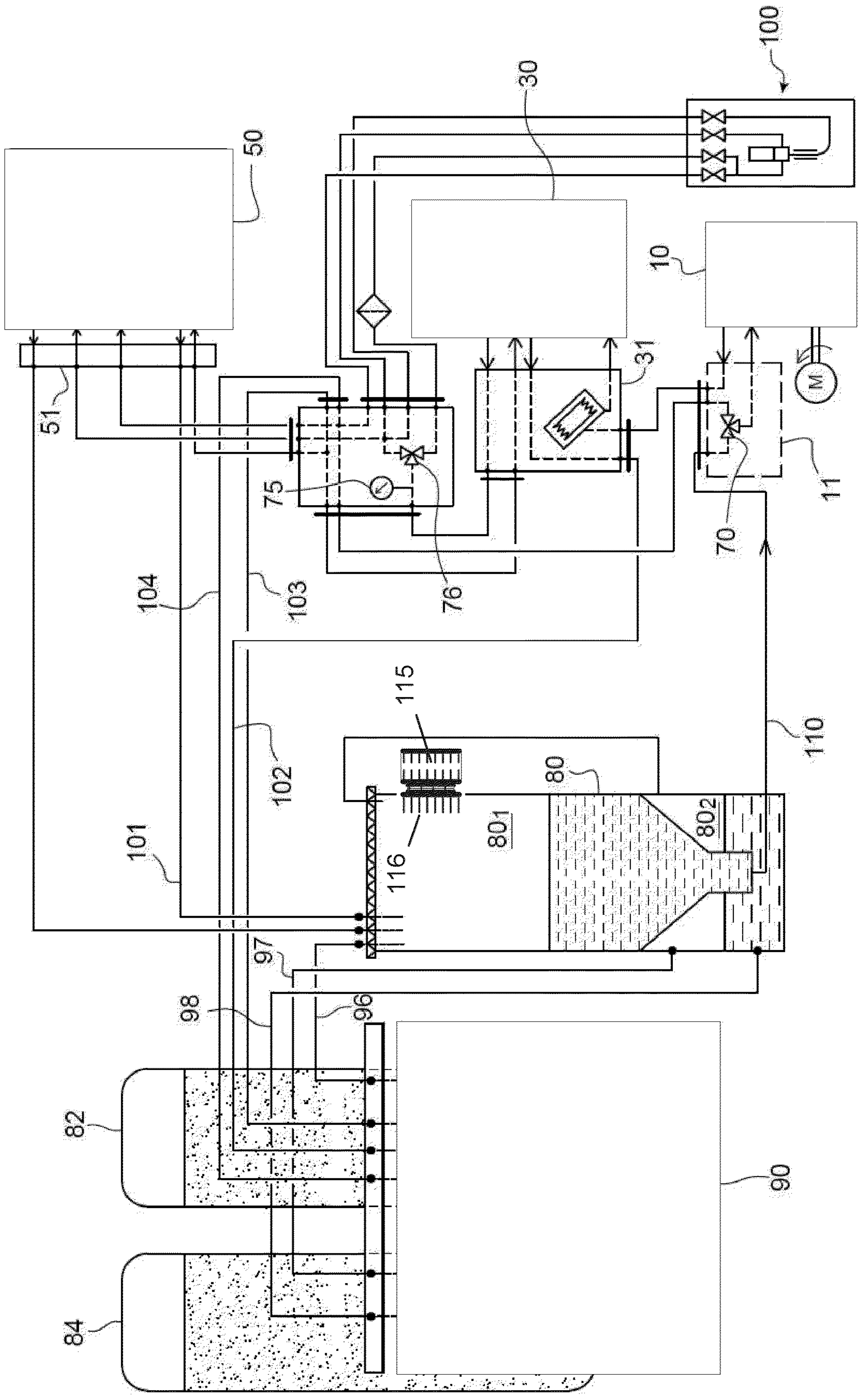
FIGS. 4A-4C show detailed views of examples of ink circuits for a CIJ printer.

FIG. 4A shows an example ink circuit of a CIJ printer according to some implementations. The ink circuit of FIG. 4A comprises a main reservoir 80, an ink cartridge 82 and a solvent cartridge 84, a pump module 10, a filter module 30, a recovery module 50, and a multi-functional hydraulic module 90 and a number of ducts to connect the cartridges 82, 84, the reservoir 80, and the different modules 10, 30, 50, 90. A condenser (e.g., Peltier cell) 115 can also be attached to the ink reservoir 80. Peltier cell 115 can act as a condenser to condensate solvent vapor and return it to the ink in the reservoir.

As can be understood from this figure, any of the modules 10, 30, 50, and 90 can be independently manipulated and replaced without impacting the rest of the components of the ink circuit. For instance, any of the modules can be replaced by a similar or identical module. In another example, any module can be replaced by a different model of the module that performs similar functions. For instance, any module can be replaced by a technically updated module.

Figure 4B:
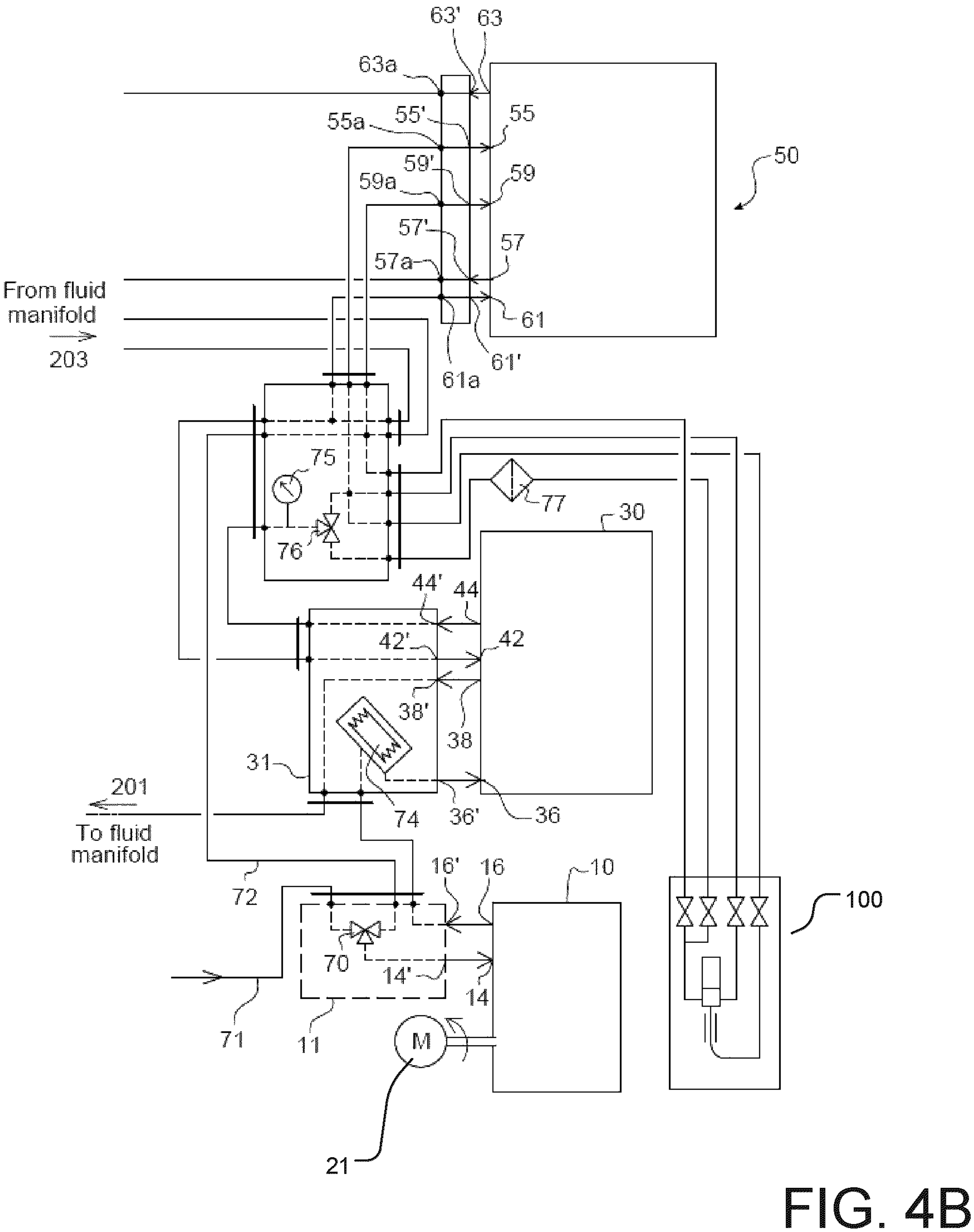

As shown in FIG. 4B, a 3-way valve 70 can be connected to the inlet 14 of the ink pressure pump module 10. Depending on the operation stage of the printer, the fluid to be introduced into the module 10 is selected, with help of the valve 70, among a first fluid (ink supplied though a first duct 71) and a second fluid (air and/or solvent supplied though a second duct 72). The first fluid is thus pumped by pump 24, for example when the printer is printing, and is then sent to the print head through the fluid circuit, and in particular through the filter module 30. The second fluid is pumped by pump 24, for example when the circuit is being cleaned.

A damper 74 can be connected on the fluid path to the inlet 36 of the filter module 30 (between fluid outlet 16 of module 10 and fluid inlet 36 of module 30), in order to damp the pressure variations or oscillations of the ink before sending it to the print head, for instance, pressure variations or oscillations being generated by the pump and degrading the print quality. The fluid then flows through filter module 30 and is then sent to the print head through part of the fluid circuit, for example through a fluid manifold as illustrated on FIGS. 4B and 4B by arrows.

A 3-way valve 76 can be connected to the outlet 44 of the filter module 30. Depending on the operation stage of the printer, the fluid flowing out of the filter module 30 can be sent, through the valve 76, either to the print head 100 (possibly through an additional filter 77) or to the main reservoir of the circuit (through the recovery module 50). A sensor 75 can be implemented to measure the pressure and/or the temperature of the fluid flowing out of the filter module 30.

Figure 4C:
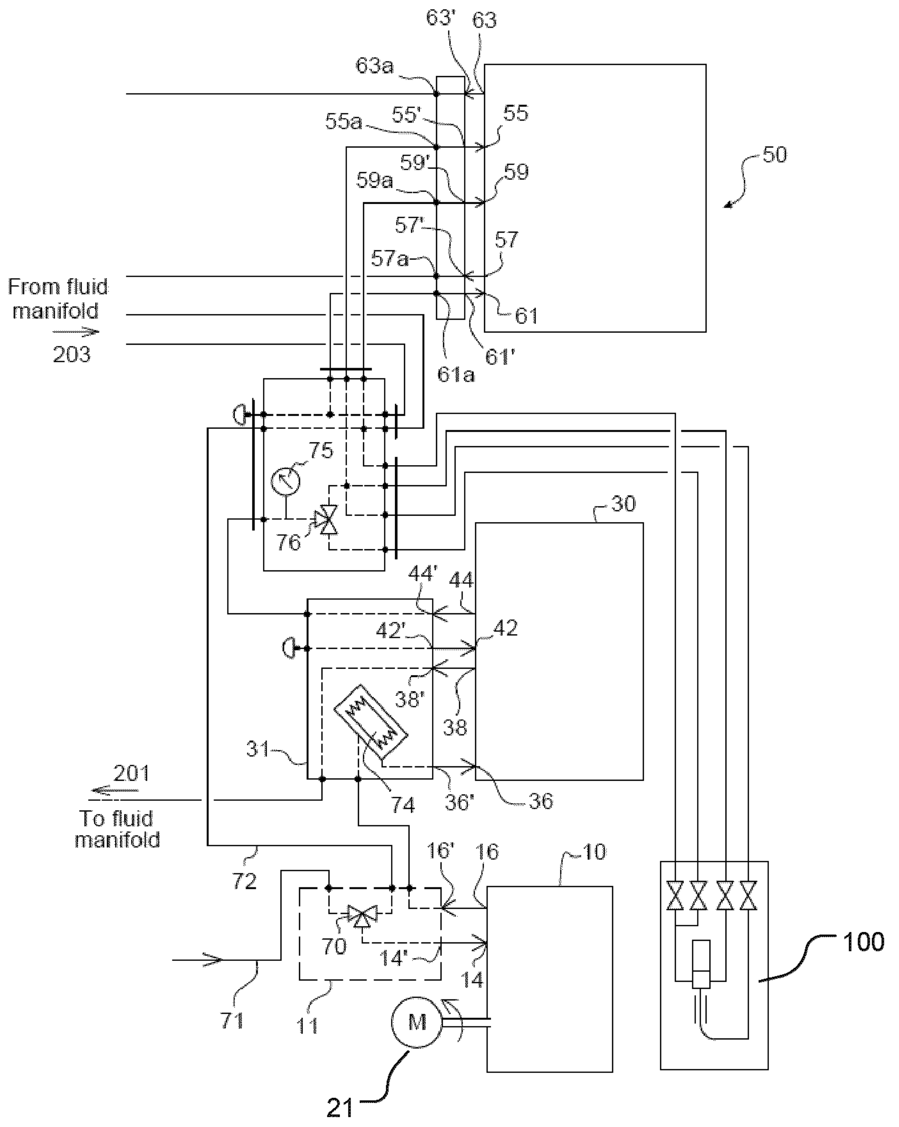

The ink circuit of FIG. 4B can be used, for example, in CIJ printers that use dye-based inks. The ink circuit of FIG. 4C is very similar to the ink circuit of FIG. 4B. However, this circuit can be particularly advantageous when used, for example, in CIJ printers that use pigmented inks.

Figure 5A:
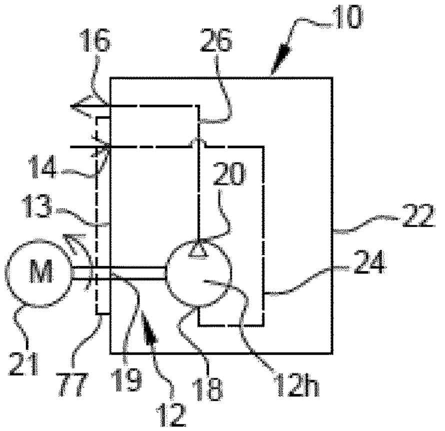
FIGS. 5A-5C show aspects of an example of a pump module.
Figure 5B:
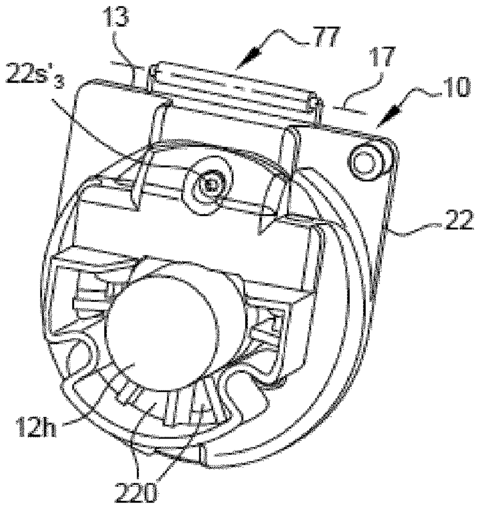
Figure 5C:
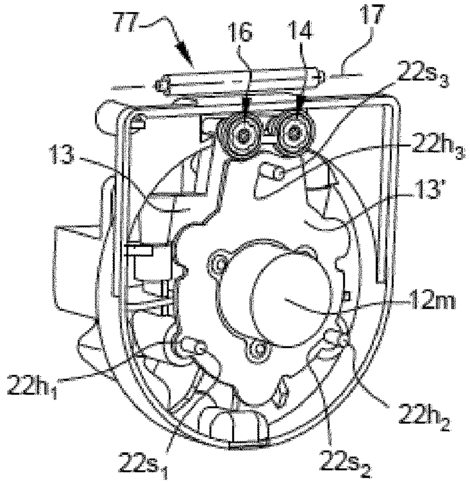

FIG. 5A-C show aspects of an example of a pump module.

An example of a pump module (or ink pressure pump module) 10 is shown in FIG. 5A. It includes a housing or support 22, possibly including a front side or cover 13; the module 10 includes a fluid inlet 14 and a fluid outlet 16; inside the module or its housing, at least the hydraulic part 12*h* of a pump 12 is connected to the fluid inlet and the fluid outlet. As shown in FIG. 5A, the motor 21 of the pump 12 can be located outside the pump module, because it is robust and sturdy; in such case, the axis 19 of the pump, which connects the motor and the hydraulic part, extends through the cover 13 of the pump module 10, only the hydraulic part of the pump being contained in housing 22. In a variant, the pump, including its hydraulic part and its motor is completely housed in the pump module. The pump inlet 18 and the pump outlet 20 can be directly connected to the fluid inlet 14 and the fluid outlet 16 by ducts 24, 26, the fluid circulating from the 15 fluid inlet 14 to the pump 12 and then from the pump 12 to the fluid outlet 16. Preferably no other fluidic element is present between the fluid inlet 14 and the pump inlet 18 and between the fluid outlet 16 and the pump outlet 20.

The pump 12 shown in FIG. 5A includes a hydraulic part 12*h*, a motor 21 and an axis 19 coupling the hydraulic part 12*h* and the motor 21; the pump can 12 be of the magnetic type. Such a magnetic pump includes a shell (part of which is referenced 12*m* on FIG. 5C) containing a hydraulic part, or impeller, coupled to a shaft which bears an inner magnetic ring; outside the shell, an outer magnetic ring is mounted on a drive shaft and is magnetically coupled to the inner magnetic ring through the shell.

A motor can drive the drive shaft and the outer magnetic ring in rotation (the motor 21 and the outer magnetic ring 190 are visible on FIG. 10A); in turn, the outer magnetic ring drives the inner magnetic ring, and the impeller, in rotation because of the magnetic coupling. In case of a magnetic pump, the axis 19 of FIG. 5A is the drive shaft, the impeller and its shaft being housed in the housing 22.

Any of the embodiments of this module can be provided with one or more members 77 to allow mounting and disassembling, as described below in connection with FIGS. 6C-6D. The members 77 are represented on FIGS. 5A-5C, along axis 17 and positioned along a side of the housing 22 or of its cover. The remainder (or the other part) of the machine may include members (for example holes 770, 771, visible on FIG. 10B) to cooperate with retractable members or pins $77_2$, $77_3$ of the members 77.

In some embodiments, it is the remainder (or the other part) of the machine which may include one or more members or pins $77_2$, $77_3$ (each cooperating with a spring), the module 10 being equipped with corresponding holes to cooperate with the members or pins.

In both embodiments the ink circuit has a receiving portion or zone or interface to receive the module, which can be mounted on and dismounted from the receiving portion or zone or interface, for example with one or more screw(s), or nut(s), 15 or bolt(s), or clip(s), or clamp(s) or hook(s) or any other securing means. Hole 22*h*1, 22*h*2, 22*h*3 are visible on FIG. 5C to accommodate screws 22*s*1, 22*s*2, 22*s*3, one screw head 22*s*'3 being visible on FIG. 5B.

FIG. 6A-D shows aspects of an example of a filter module.

Figure 6A:
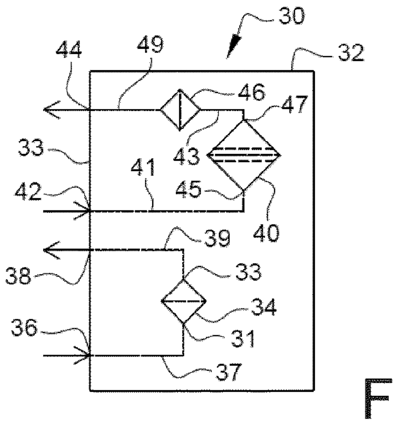
FIGS. 6A-6D show aspects of an example of a filter module.

An example of a filter module 30 is shown in FIG. 6A. It includes a housing 32, possibly including a cover 33; the module includes one or more fluid inlet(s) 36, 42, and one or more fluid outlet(s) 38, 44; inside the module or its housing, one or two filter(s) 34 (a so-called "grid filter"), resp. 40 (a so-called "main ink filter") is/are connected to a corresponding set of fluid inlet 36, resp. 42 and fluid outlet 38, resp.44. As shown in FIG. 6A, the main filter inlet 45 and the main filter outlet 47 can be directly connected to the fluid inlet 42 and the fluid outlet 44 by one or two duct(s) 41, 43. Another filter 46 can be connected between main filter outlet 47 and the fluid outlet 44. Preferably, no other fluidic element is present between the fluid inlet 36, resp. 42 and the filter(s) inlet(s) 31, 45 and between the fluid outlet 38, resp. 44 and the filter(s) outlet(s) 33, 47.

Figure 6B:
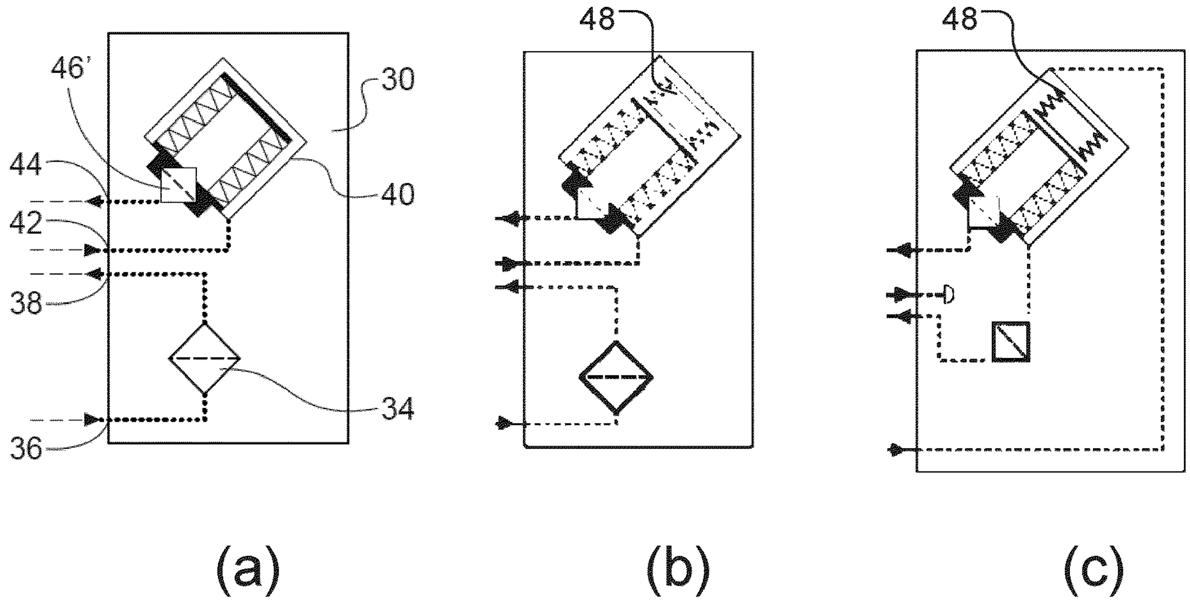

Another embodiment of the filter module 30 is shown in FIG. 6B (a).

The reference numbers are the same as on FIG. 6A and designate the same elements, except for the filter 46 which is replaced by a filtering grid 46' at the outlet of the main filter 45.

FIG. 6B (b) illustrates a further embodiment of filter module 30. The reference numbers are the same as on FIG. 6B (a) and designate the same components. In this embodiment, the filter module 40 includes a damper 48. For instance, this filter module 30 can be used in the ink circuit of FIG. 4B. Damper 48 cooperates with external damper 74 to damp pressure variations or oscillations of the ink before sending it to the printhead, such as pressure variations or oscillations generated by the main ink pump that can degrade print quality.

A configuration with two dampers 74, 48 enables damping levels which would be difficult to attain by using a single damper thanks to the global damping caused by the combined effects of the two dampers 74, 48.

Furthermore, the configuration shown in the embodiment of FIG. 6B (b) in combination with the ink circuit of FIG. 4B is particularly advantageous. A first damper 74 can be placed on the main pressure line, which is subject to a high flow rate. For example, a first damper 74 can be placed on the fluid path out of inlet 36 of the filter module 30. A second damper 48 can be placed on the jet generation line, which is subject to a low flow rate. For example, a second damper 48 can be placed inside the housing of the filter module, floating above the main filter 40. Placing a second damper on a small flow rate line enhances the behavior of the damper as the flow is lower, and the damper may compensate higher pressure drops. This configuration can achieve high quality printing results.

FIG. 6B (c) shows a further embodiment of a filter module including a damper 48. This kind of filter module is suitable, for instance, in CIJ printers that use pigmented inks. For instance, this kind of filter module can be used, in an ink circuit such as the one illustrated in FIG. 4C. Although in this case both dampers 48, 74 are placed on the main pressure line, the presence of a second damper inside the filter module still provides better printing results than using an ink circuit with only one damper 74.

The ink circuit has a receiving portion or zone or interface to receive the filter module and connect it to the hydraulic circuit of the printer. The receiving portion or zone or interface has at least two fluid inlets which correspond to the fluid outlets 38 and 44 and at least two fluid outlets which correspond to the fluid inlets 36 and 42 of the second whole-block assembly, so that fluid can flow from the interface outlet(s) into the second whole-block assembly and then out of the second whole-block assembly to the interface inlet(s). In a simpler embodiment, the module includes one fluid inlet, one fluid outlet and one filter; the corresponding receiving portion or zone or interface to receive the filter module and connect it to the hydraulic circuit of the printer has one fluid inlet which corresponds to the fluid outlet of the module and one fluid outlet which corresponds to the fluid inlet of the module.

An example of the receiving interface is described below. The filter module can be mounted in or on the ink circuit or on the receiving portion or zone or interface; it can be demounted from the circuit or from the receiving portion or zone or interface of the ink circuit. For example, one or more screw(s), or nut(s), or bolt(s), or clip(s), or clamp(s) or hook(s) or any other suitable fastener can be used to mount and remove the filter module. Holes **32*h*1, 32*h*2, 32*h*3, 32*h*4 are visible on FIG. 6D to accommodate screws 32*s*1, 32*s*2, 32*s*3, 32*s*4, 3 screw heads 32*s*'1, 32*s*'2, 32*s*'3 being shown on FIG. 6**C.

This filter module, like any other module in this application, can be provided with an identifier, for example an electric identifier or a radio frequency identifier (RFID) identifier or a magnetic identifier, to identify which embodiment is implemented, for example which filter(s) is/are implemented in the module. Electric identifiers, RFID identifiers and magnetic identifiers are described below.

Figure 6C:
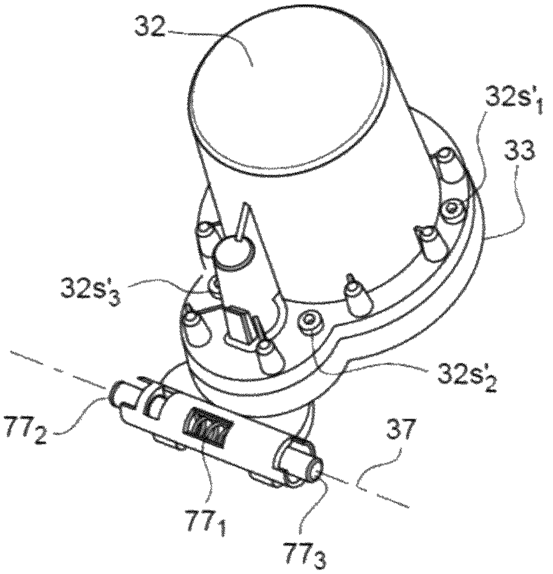
Figure 6D:
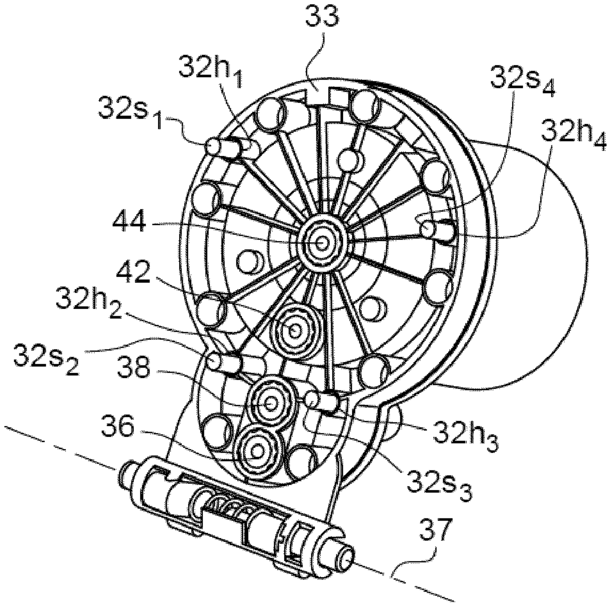

FIGS. 6C and 6D show an embodiment of a filter module 30 according to the invention. The module is preferably able to pivot or is rotatable around an axis (or hinge or pivot pin) 37.

Preferably the module is provided with means 77 to allow mounting and dismounting of the module 30. These means may allow the defining of axis (or hinge or pivot pin) about which the module is able to pivot. These means may be in the form of retractable members or pins $77_2$, $77_3$ returned by a spring $77_1$.

According to some embodiments, the means 77 include a cylinder, aligned along axis 37 (axis of rotation) and containing the retractable members or pins $77_2$, $77_3$ the spring $77_1$. Spring $77_1$ is located between both pins $77_2$ and $77_3$, and is able to be compressed in the cylinder under their action. Each pin can move between an extended position as in FIG. 6B and a retracted position. At each end of the cylinder there is provided an opening through which the members or pins $77_2$ and $77_3$ can easily enter and exit and thereby be placed in a fixed position along the axis 37 (as in FIG. 6C or 6D) and an unlocked position in which the retractable members or pins $77_2$, $77_3$ are at least partly engaged in the cylinder and in which the module can be removed from the axis.

The members $77_2$ and $77_3$ cooperate with corresponding members (for example holes) on the remainder of the machine.

In another embodiment, it is the remainder of the machine which may include one or more members or pins $77_2$, $77_3$ (each cooperating with a spring), the module 30 being equipped with corresponding holes to cooperate with the members or pins. The module can thus be mounted and disassembled from the hydraulic circuit of the printer.

Means 77, $77_1$-$77_3$ can also be applied to at least one of the other module(s) 10, 50, and 90 described in connection with FIGS. 5A-5C, 7A-7D, 8A-8C or to the parts of the circuit or the printer with which the module(s) cooperate. One such member is schematically represented on FIGS. 5A-5C, resp. 7E, positioned along a side of the housing 22, resp.52, or of its cover. Thus, the module is able to pivot or is rotatable around axis 17, resp.67, and can be locked in a fixed position along the axis 17, resp.67, and easily removed from the position.

FIG. 7A-7D show aspects of an example of a recovery module.

Figure 7A:
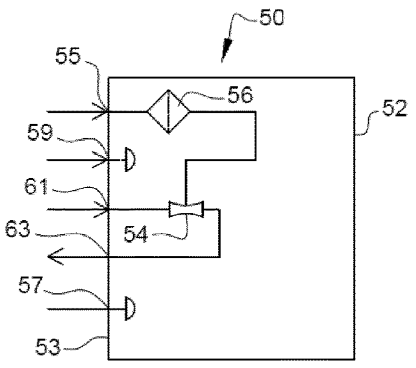
FIGS. 7A-7F show aspects of an example of a recovery module.
Figure 7B:
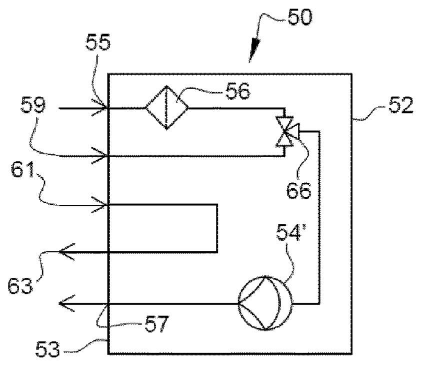
Figure 7C:
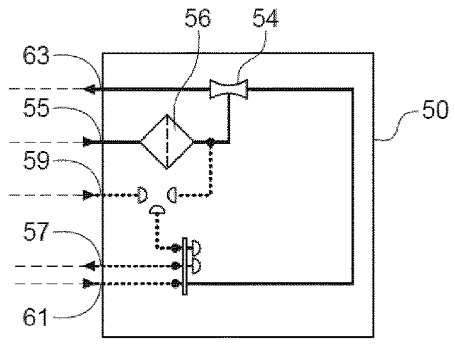
Figure 7D:
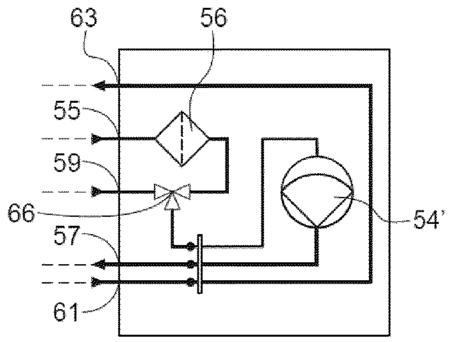

Two different examples of a recovery module 50 are shown in FIGS. 7A and 7B and variants thereof are shown in FIGS. 7C and 7D. In an example, module 50 includes a housing 52, possibly including a cover 53; the module includes one or more fluid inlet(s) 55, 59, 61, and one or more 10 fluid outlet(s) 57, 63; inside the housing, a recovery device, for example a venturi 54 (FIGS. 7A, 7C) or a diaphragm pump 54' (FIG. 7B, 7D), is to recover from the printing head ink not used for printing, the recovery device outlet being connected to one of the fluid outlets 57, 63; a filter 56 can be connected between the fluid inlet 55 and the recovery device in order to filter the ink recovered from the printing head; as shown in these figures, in the examples of FIGS. 7A and 7C, fluid inlet 55 is for ink returning from the printhead and fluid inlet 61 is for solvent or air; this embodiment is preferred if the ink does not generate foam; on these two figures, the outlet 57 and the inlet 59 are not used and can be dispensed with; 20—in the examples of FIGS. 7B and 7D, at least one 3-way valve 66 can also be connected between the filter 56 and the pump 54' in order to select a fluid from inlet 55 (usually ink returning from the printhead) or inlet 59 (usually solvent or air); this embodiment is preferred if the ink generates foam; on these two figures, the inlet 61, the outlet 63 and the venturi are not used and can be dispensed with. 25 FIG. 7C, resp. 7D, are variants of the examples of FIG. 7A, resp. 7B, showing the same elements as on FIG. 7A, resp.7B, positioned differently inside the housing.

Module 50, like any other module in this application, can also be provided with an identifier, for example an electric identifier or an RFID identifier or a magnetic identifier, to identify which embodiment is implemented, for example an embodiment according to FIG. 7A, including a venturi 54 as recovery device, or an embodiment according to FIG. 7B, including a pump 54' as recovery device.

For example, electrodes or contacts of an electric identifier (for example a resistor) can be apparent or accessible through a window of the housing of any module 5 and contact corresponding electrical contacts of the ink circuit or in the interface when the module, for example module 50, is mounted in the circuit or on the interface. The identifier can be for example a resistance with a first value of resistance for a module according to FIG. 7A and a second value of resistance, different from the first value, for a module according to FIG. 7B; a third value of resistance can correspond to another case, for example the absence of a module (an infinite value of resistance is detected if no module is present), or a module according to FIG. 7C or 7D.

Additionally or alternatively, any module or module type can have a RFID identifier or tag, storing identification information, the printer having means to read the information stored in the RFID identifier or tag.

Another identifier of any module or module type or whole-block assembly in this application, can be of the magnetic type, for example based on an electrical switch, for example a "reed switch", operated by an applied magnetic field.

For example, a module may include several possible locations of one or more magnet(s), each location corresponding to a particular module or whole-block 20 and/or to at least one technical characteristic of the module or whole-block. Several switches are located at different locations in the ink circuit. Depending on the location of the magnet(s) in the module, one or more of the switches is/are activated, which is detected by the printer or its controller. An identification of the module and/or of its technical characteristic(s) is thus obtained. Additionally or alternatively, a plurality of magnets can be located in the ink circuit, one or several of them interacting with one or more electrical switch(es) of the module, for example a "reed switch", depending on the location of the switch(es), the location of the switch(es) depending on one or more technical characteristics of the module.

In some embodiments, an identifier of a module includes several (N) magnets disposed at several (N or more than N) possible locations in the module, each combination of magnets locations providing the identification of a particular module or whole-block and/or of at least one technical characteristic of the module or single block; for example, each combination of locations identifies a different type of pump or a different type of filter or a different type of recovery device. Each magnet of the combination interacts with means in the circuit, for example a switch, for example a "reed switch", which interaction is detected by the printer. This multiplies the possible identifications with respect to the identifications with only one magnet.

For example, if a module has two possible locations for a magnet: —2 identifications can be formed by one magnet in any of the two locations and no magnet in the other one; these identifications are designated by (1,0) and (0,1), "1" representing the presence of a magnet and "0" the absence of a magnet; —one further identification is formed by two magnets, one in each of the two possible locations (1, 1).

In this case of two possible locations, 3 identifiers can thus be created, identifying 3 different modules or three variants of a same module.

Another example concerns the case of a module having three possible and different locations for one or more magnets: —Three identifications can be formed by one magnet in any of the 3 locations and no magnet in the other locations; these identifications are designated by (1, 0, 0), 20 (0,1,0), (0,0,1), "1" representing the presence of a magnet and "0" the absence of a magnet; —other identifications are be formed by the three combinations of two magnets in the 3 possible locations (1, 1, 0), (0,1,1), (1,0,1) and by the 3 magnets in the 3 possible locations (1, 1, 1).

In this case of three possible locations, seven identifiers can thus be created, identifying seven different modules or seven variants of a same module.

Of course, more identifications are possible with n>3.

Each magnet can interact with components in the circuit, for example a switch, for example a "reed switch", disposed at a predefined location in the circuit or in the 30 interface to interact with a magnet disposed at a corresponding predefined location in the module. For example, for 3 locations of 3 different magnets in the module, 3 switches are provided in the circuit, each one being able to interact with one magnet when it is in one specific position in the module. Any module and the ink circuit, or the corresponding interface of the module in the circuit, can be provided with the means to implement at least one of the above-mentioned identifiers. For example, the characteristics of the main filter 40 of the filter module (see FIGS. 6A-6B) can be identified with such an identifier. Or the characteristics of the pump 12 of the pump module (see FIGS. 5A-5C) can be identified with such an identifier.

The ink circuit has a receiving portion or zone or interface to receive the recovery module and connect it to the hydraulic circuit of the printer. The recovery module can be mounted in or on the ink circuit or on the receiving portion or zone or interface; it can be demounted from the circuit or from the receiving portion or zone or interface of the ink circuit. For example one or more screw(s), or nut(s), or bolt(s), or clip(s), or clamp(s) or hook(s) or any other securing means can be used to mount and remove the module (see the examples of FIGS. 7E and 7F).

The receiving portion or zone or interface has at least two fluid outlets which correspond to the fluid inlets 55 and 61 (FIG. 7A) or 55 and 59 (FIG. 7B) and at least one fluid inlet which corresponds to the fluid outlet 63 (FIG. 7A) or 57 (FIG. 7B) of the third whole-block assembly, so that fluid can flow from the interface outlets into the third whole-block assembly and then out of the third whole-block assembly to the interface inlets.

Preferably, the receiving portion or zone or interface has at least three fluid outlets which correspond to the fluid inlets 55, 59 (FIG. 7A) and 61 (FIG. 7B) and at least two fluid inlets which corresponds to the fluid outlets 63 (FIG. 7A) and 57 (FIG. 7B) of the third whole-block assembly; thus, a same receiving portion or zone or interface can connect different types of recovery modules.

An example of the receiving interface is described below.

Any of the embodiments of this module 50 can be provided with one or more means 77 as described above in connection with FIGS. 6C-6D. Such means are represented on FIG. 7E, positioned along a side of the housing 52 or of its cover 53.

Conversely, it is the remainder of the machine which may include one or more means 77, the module 50 being equipped with corresponding means (for example holes) to cooperate with the means 77. In both cases the module 50 can be mounted along an axis (axis 67 on FIGS. 7E) and dismounted and removed from the axis. It is able to pivot or 5 rotate around the axis 67 and can be locked and unlocked easily.

Figure 7E:
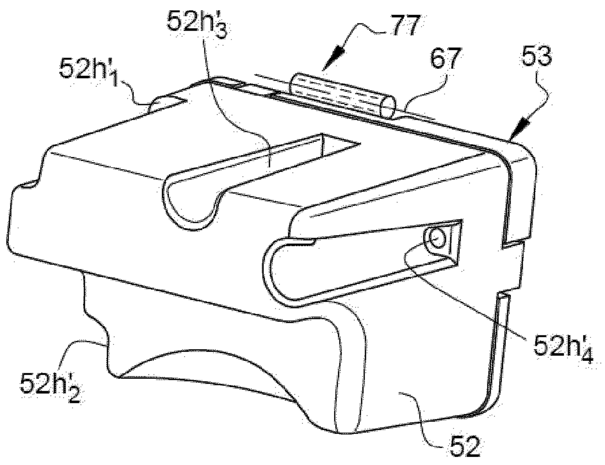
Figure 7F:
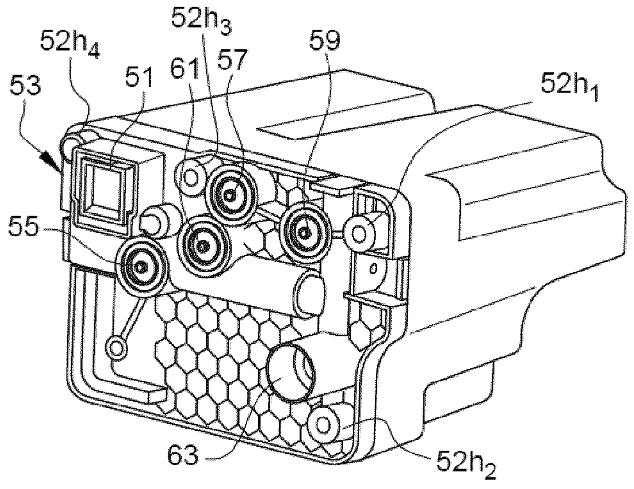

FIGS. 7E and 7F show an embodiment of a vacuum or recovery module 50 according to the invention. A cover 53 contains all fluid inlets/outlets.

Electrical contacts 51 of an electric identifier can be seen through an opening in cover 53; as explained above, they can be contacted by corresponding 10 contacts of the circuit for identification of the embodiment of the module, the controller of the printer measuring the value of the resistance value through the contacts. In a variant, as explained above, an identifier can include means, for example one or more electrical switch(es), for example one or more "reed switch (es)", located in the ink circuit and which can be operated by a magnetic field 15 generated by one or more magnet(s) located in the module.

The ink circuit has a receiving portion or zone or interface to receive the vacuum or recovery module 50, which can be mounted in the ink circuit or demounted from the receiving portion or zone or interface of the ink circuit, for example with one or more screw(s), or nut(s), or bolt(s), or clip(s), or clamp(s) or hook(s) or any other securing 20 means. Holes **52*h*1, 52*h*2, 52*h*3, 52*h*4, 52*h*'1, 52*h*'2, 52*h*'3, 52*h*'4 are shown on FIGS. 7E and 7**F to accommodate screws.

Figure 8A:
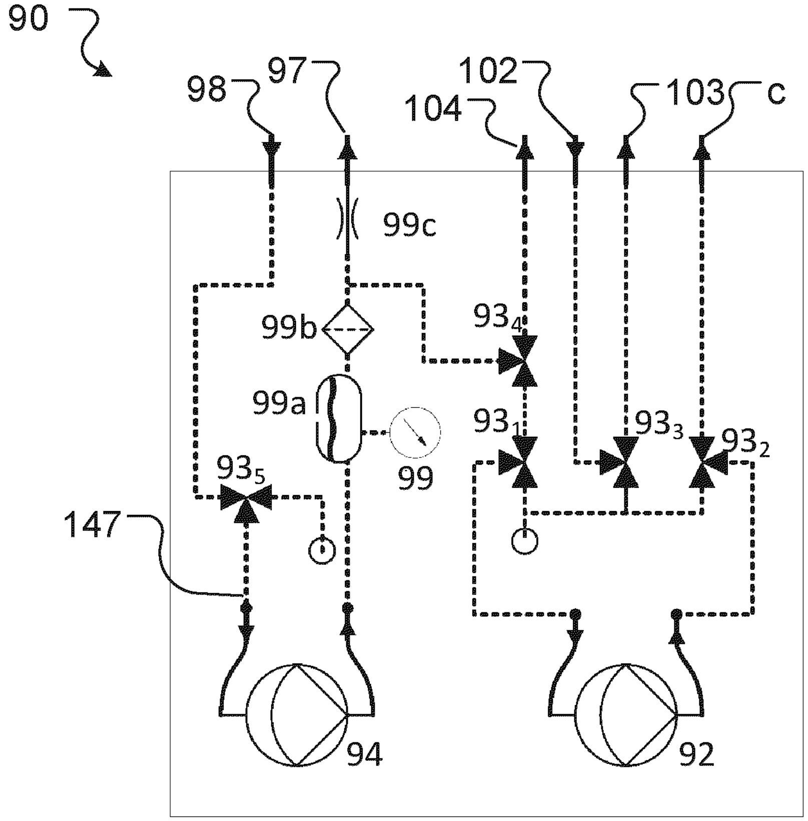
FIGS. 8A-8C show aspects of an example of a multifunctional hydraulic module.
Figure 8B:
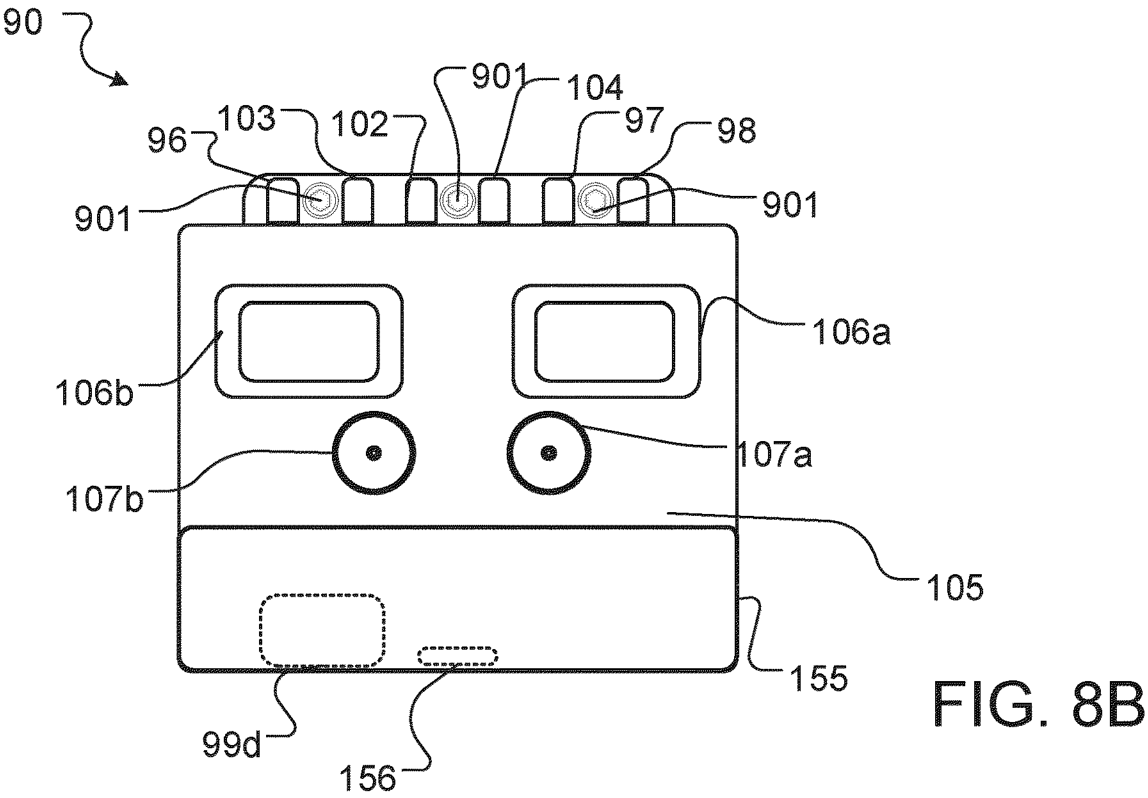
Figure 8C:
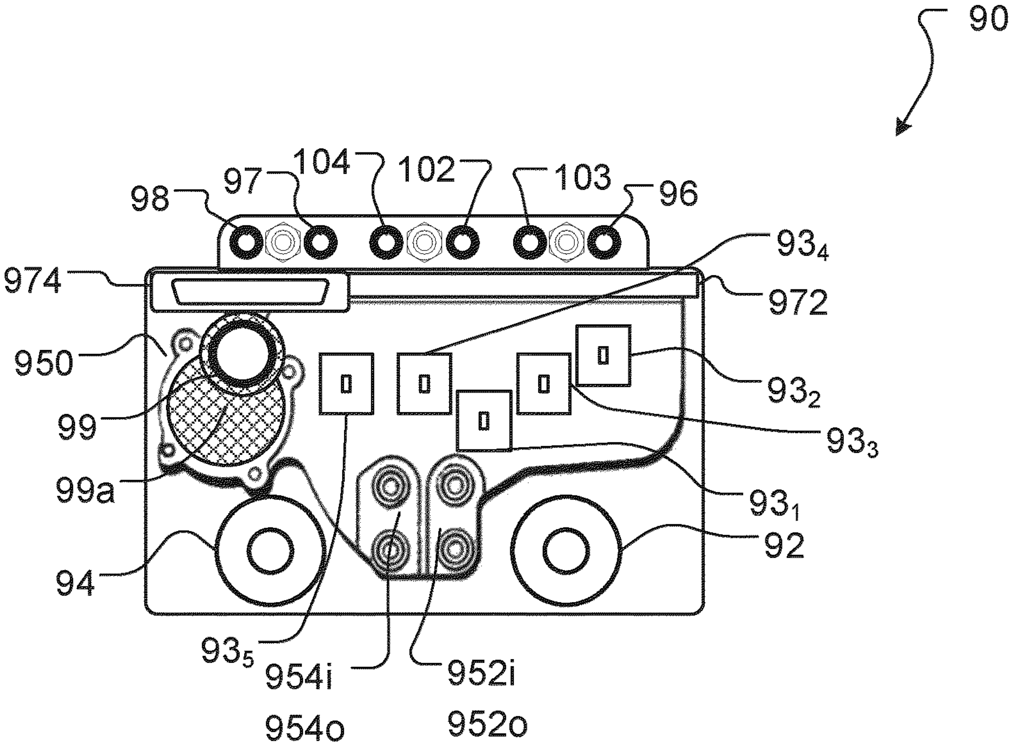

FIGS. 8A-8C show aspects of an example of a multifunctional hydraulic module 90.

FIG. 8A depicts a diagram of an example hydraulic module.

The hydraulic module 90 as depicted in FIG. 8A preferably has an ink portion and a solvent portion, the ink portion including ink pump 92 for pumping the ink from ink cartridge 82 and the solvent portion including pump 94 for pumping the solvent from solvent cartridge 84. It can also include a number of 3-way valves $93_1$, $93_2$, $93_3$, $93_4$, and $93_5$ to send the appropriate fluid to the appropriate module 10, 30, 50 and/or to the reservoir 80. Ducts 96-98 connect the ink portion and the solvent portion of the hydraulic module 90 with the reservoir 80; ducts 102-104 connect the ink portion and the solvent portion of the hydraulic module 90 with the rest of the ink circuit, for instance, with one or more of the pump module 10, the filter module 30, and the recovery module 50.

An additional solvent damper **99*a* and a pressure sensor 99 for the solvent can also be present in the module. A filter 99*b*, for instance, a grid filter 99*b*, can also be present in the line to protect a restrictor 99*c* placed at outlet 97 to restrict the cross-section of outlet line 97**.

FIG. 8B shows a front view of an example of a multifunctional hydraulic module 90.

Module 90 includes one or more RFID antennas. For example, module 90 includes two RFID antennas **106*a*, 106*b* to detect the ink and solvent cartridges and read and write information about the ink and solvent cartridge status. Module 90 also includes a housing 105. In an example, housing 105 can include a retention tank or tray 155 to collect liquid leaks in the bottom part of module 90. For instance, the retention tank or tray 155 can be placed under the ink and/or solvent cartridges, while the upper part of module 90 is placed behind the ink and solvent cartridges 82, 84, and in fluidic connection with them thanks to cannulas 107*a* and 107*b***.

A stirring motor **99*d*, for instance, with magnets, can also be placed inside the retention tank 155 to stir the ink from the ink cartridge. For instance, the stirring motor can be placed below the ink cartridge. For instance, the stirring motor can be placed at the bottom of the retention tank 155**.

A leak detection sensor 156 can also be included in the retention tray 155 to detect any leaks from the ink and/or solvent cartridges. The leak detection sensor 156 can be placed inside the retention tank 155. For instance, the leak detection sensor 156 can be any suitable fluid detection sensor. The fluid detection sensor can be placed, for instance, at the bottom of the retention tray 155. The fluid detection sensor can be a conductivity sensor including, for instance, two sets of spaced conductors. If there is a fluid leak, thanks to the conducting nature of the fluid, the sensor would detect that the conductors are in electric contact. Additionally or alternatively, other types of fluid sensors can be used, for instance, a float sensor and/or a pressure sensor.

The leak detection sensor 156 can also be a solvent vapor sensor. Since the solvent is very volatile, a solvent vapor sensor can allow to detect small leaks that would not be detected with liquid detection sensors. The solvent vapor sensor can be placed inside the retention tank 155, for instance at the bottom or on any of the walls of the retention tank 155. The solvent vapor sensor can detect an amount of solvent vapor, and determine that there is a leak if the solvent vapor is above a certain threshold, for instance above the usual amount of solvent vapor present in the cabinet.

If the leak detection sensor detects an ink leak or a solvent leak, a warning message can be provided at the user interface 6. For instance, the printer can be automatically stopped and instructions to perform curative maintenance can be provided at the user interface 6.

In the upper part of module 90, inlets and outlets 96, 97, 98, 102, 103, and 104 establish fluidic connection with the rest of the ink circuit.

Module 90 can be secured to the chassis 300 thanks to connectors 901.

FIG. 8C shows a rear view of an example of a multifunctional hydraulic module 90.

FIG. 8C shows the rear part of inlets and outlets 96, 97, 98, 102, 103, and 104 that fluidly connect module 90 to the rest of the ink circuit.

Advantageously, module 90 includes a hydraulic manifold 950 to fluidly connect the hydraulic components of module 90 in a compact manner.

Hydraulic module 90 can for example include an ink pump 92 for pumping the ink from ink cartridge 82 and a solvent pump 94 for pumping the solvent from solvent cartridge 84. The ink pump 92 is hydraulically connected to the rest of the elements of module 90 thanks to conduits attached to inlets and outlets **952*i*, 952*o* of the hydraulic manifold 950. The solvent pump 94 is hydraulically connected to the rest of the elements of module 90 thanks to conduits attached to inlets and outlets 954*i*, 954*o* of the hydraulic manifold 950. Module 90** also includes electrovalves $93_1$, $93_2$, $93_3$, $93_4$, and $93_5$.

A pressure sensor 99 for the solvent is also included in module 90 and connected to hydraulic manifold 950. An additional solvent damper **99*a* can be optionally present in module 90 to damp the vibrations caused by the pumps. A filter 99*b*, for instance, a grid filter 99*b*, can also be present in the line to protect a restrictor 99*c* placed at outlet 97** to restrict the cross-section of the outlet line.

Connector 974 electronically connects the connector board 972 of module 90 to the rest of the electronic components of the CIJ printer. For instance, connector board 972 can host a microcontroller to process RFID signals from the RFID antennas 106*a*, 106*b* and provide ink and solvent cartridge identification information to the controller 500 of the CIJ printer.

Figure 9A:
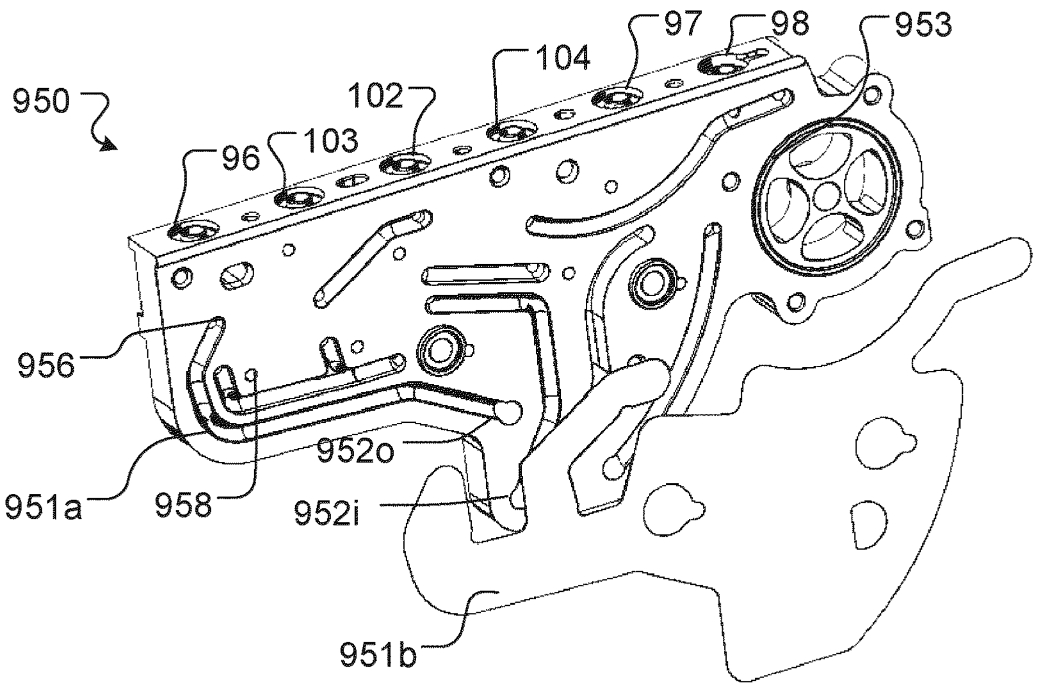
FIGS. 9A-9B show aspects of an example of a hydraulic manifold.

FIG. 9A shows an exploded front view of an example hydraulic manifold 950. The front part of the hydraulic manifold 950 is attached to the internal side of the front part of the housing 105 of module 90.

Hydraulic manifold 950 includes a network of internal channels 956 and orifices 958 that can be used to fluidly connect the components of module 90 attached to the rear part of the hydraulic manifold 950.

The network of internal channels 956 is machined on the surface of a piece of metal 951*a*. Piece 951*a* can be advantageously made of steel. For instance, piece 951*a* can be made of stainless steel.

Once the network of channels 956 is machined on piece 951*a*, a thin piece of metal 951*b* is laser welded to piece 951*a* to form the hydraulic manifold 950. Advantageously, the thin piece of metal 951*b* is also made of steel, for instance, stainless steel. Stainless steel is a durable material that is resistant to the inks commonly used in CIJ printers. Furthermore, the use of stainless steel for pieces 951*a* and 951*b* allows to join pieces 951*a* and 951*b* using for instance laser welding.

Additionally or alternatively, the hydraulic manifold can be manufactured using one or more 3D printing systems and techniques. Other chemically resistant materials can also be used. For instance a plastic material such as "Nylon" (PA11, or PA12), polyamides, PEEK, PPS (polyphenylene sulphide), a glass material or a ceramic material can be used. This can reduce the weight and manufacturing cost of the hydraulic manifold.

Further details regarding a manufacturing process for hydraulic manifolds using 3D printing can be found in PCT/EP2021/062725, the entire contents of which are hereby incorporated by reference.

Figure 9B:
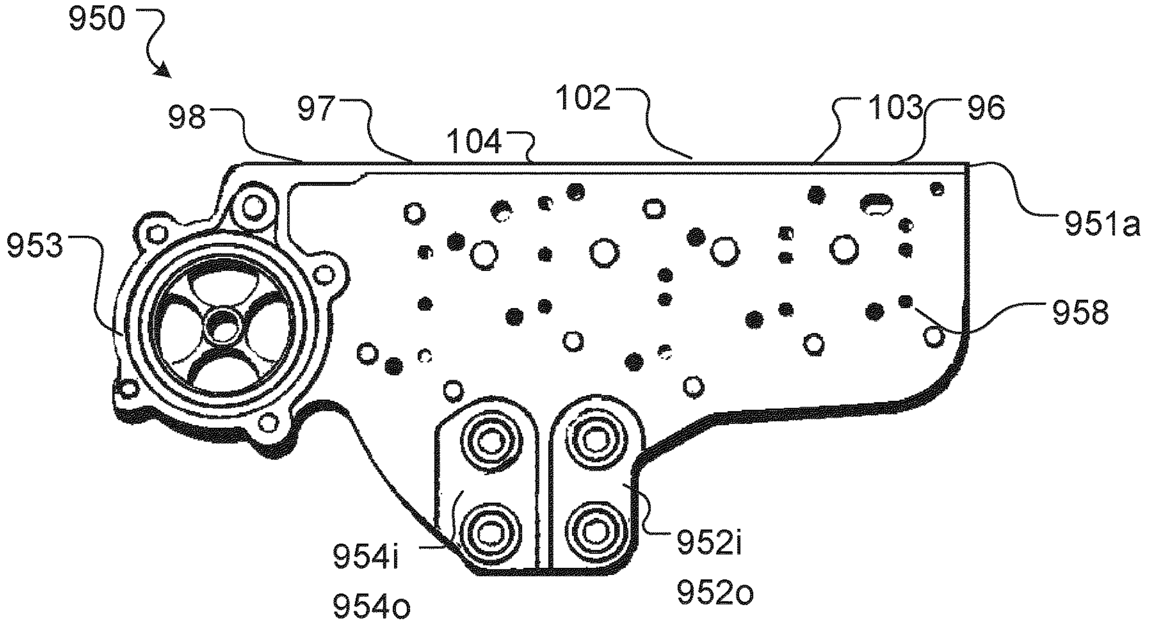

FIG. 9B shows a rear view of hydraulic manifold 950.

Electrovalves $\mathbf{93}_1$, $\mathbf{93}_2$, $\mathbf{93}_3$, $\mathbf{93}_4$, and $\mathbf{93}_5$ can be assembled to the rear part of manifold 950. The network of channels 956 and orifices 958 can distribute the ink and solvent and establish hydraulic connections among the electrovalves $\mathbf{93}_1$, $\mathbf{93}_2$, $\mathbf{93}_3$, $\mathbf{93}_4$, and $\mathbf{93}_5$.

Pressure sensor 99 can be connected to hydraulic manifold 950 attaching it to part 953 of the hydraulic manifold. This part of the manifold can also host a solvent damper 99*a*.

The ink pump 92 is hydraulically connected to the rest of the elements of module 90 thanks to conduits attached to inlets and outlets 952*i*, 952*o* in the rear part of the hydraulic manifold 950. The solvent pump 94 is hydraulically connected to the rest of the elements of module 90 thanks to conduits attached to inlets and outlets 954*i*, 954*o* in the rear part of the hydraulic manifold 950.

Advantageously, hydraulic manifold 950 can replace most portions of the conduits needed to fluidly connect the hydraulic components of module 90. This provides a much more compact connection between the components, hence reducing the space needed by the hydraulic connections in the module 90.

Hydraulic module 90 can include components that suffer most wear during operation of the CIJ printer. For instance, pumps and electrovalves are active components that due to their movement and their direct contact with circulating ink or solvent can wear relatively fast, The pressure sensor also suffers wear, although to a lesser extent. Module 90 facilitates curative maintenance operations of these elements by including them in a removable module 90 that can be easily removed and replaced by an untrained operator.

Furthermore, if it is determined that one or more of the components of module 90 or of any of the other modules 10, 30, 50 need to be exchanged, this maintenance operation can be performed in a particularly convenient manner for the operator. Since module 90 and modules 10, 30, 50 can be removed from the printer, the operator can comfortably examine or exchange elements of the module, for instance on a work table rather than in the printer itself where other components could obstruct access to the desired components.

Furthermore, the layout of module 90 also facilitates the replacement of components of the module. For instance, most of the components of module 90 can be directly accessed as long as the module is detached from the printer without needing to uninstall other components of the module to access a desired component.

Thanks to the modular nature of the ink printer and cabinet, the same cabinet can be used to provide multiple versions of a printer by mixing and matching different versions of the pump module 10, filter module 30, recovery module 50, and/or hydraulic module 90 presented above. This allows a late stage customization of the printer. For instance, the desired modules can be selected during a customization step depending on the type of ink the printer is going to use, without impacting the production of the rest of the components of the printer or their installation in the printer cabinet.

Moreover, further versions of the modules can be developed at a later stage, and can be readily used in the same cabinet without making any changes (or without any substantial changes) to the rest of the ink circuit.

A flushing or cleaning process can be implemented to clean the ink circuit, including one or more of the pump module 10, filter module 30, recovery module 50, and/or hydraulic module 90 prior to maintenance operations.

For example, one or more of the pump module 10, filter module 30, recovery module 50, and/or hydraulic module 90 can be cleaned before removing them from the printer. For example, the cleaning operation can be restricted to some of the modules 10, 30, 50, or 90, in particular if only some of the modules 10, 30, 50, or 90 are to be removed from the circuit to be repaired or replaced.

Further details regarding the flushing/cleaning process can be found in EP20306711.1 and EP20306712.9, the entire contents of which are hereby incorporated by reference.

FIG. 10A-10D show embodiments of interfaces for connecting removable or detachable modules to an ink circuit of a CIJ printer.

Figure 10A:
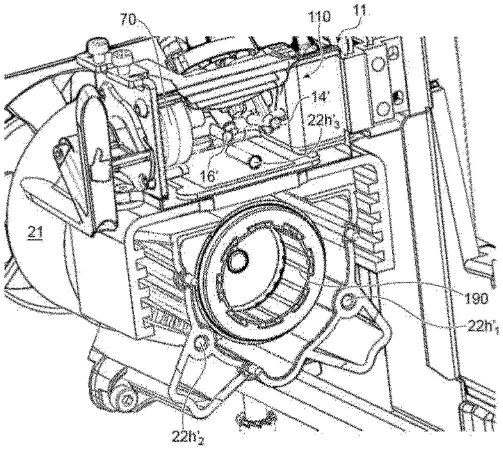
FIGS. 10A-10D show examples of interfaces for connecting removable modules to a CIJ printer.

FIG. 10A is an example of an interface 11 which includes a substantially flat surface 110 and inlet(s)/outlet(s) 14', 16' corresponding to the outlet/inlet(s) of module 10. The other side of interface 11, not visible on this figure, has inlet(s)/outlet(s) corresponding to the outlet/inlet(s) of the part of the circuit connected to the module 10 (see FIG. 4).

This figure also shows, under the interface 11, the part of a magnetic pump which remains outside housing 22 (see FIG. 5A), including the outer magnetic ring 190 and the motor 21; the part 12*m* of the shell (see above and FIG. 5C) comes into the cylindrical portion surrounded by the outer magnetic ring 190.

The interface 11 can include means to interact with an identifier of the pump module. For example, the interface 11 includes electrical contacts to contact an electric identifier of the pump module 10, as already explained above. In a variant, as explained above, an identifier can include means, for example one or more electrical switch(es), for example one or more "reed switch(es)", located in the ink circuit and which can be operated by a magnetic field generated by one or more magnet(s) located in the module.

The holes 22*h*'1, 22*h*'2, 22*h*'3 correspond to the holes 22*h*1, 22*h*2, 22*h*3 of FIG. 1C.

Figure 10B:
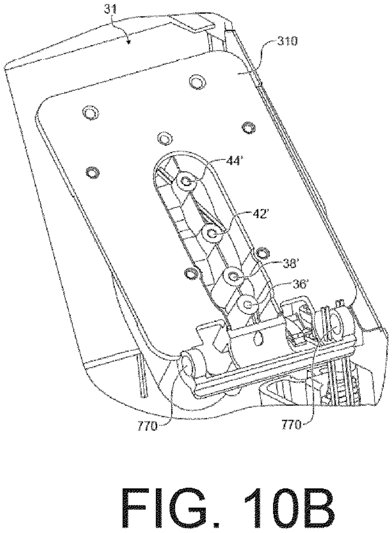

FIG. 10B is an example of interface 31 which includes a substantially flat surface 310 and inlet(s)/outlet(s) 36', 38', 42', 44' corresponding to the outlet/inlet(s) of module 30. The other side of interface 31, not visible on this figure, has inlet(s)/outlet(s) corresponding to the outlet/inlet(s) of the part of the circuit connected to the module 31 (see FIG. 4).

This figure also shows holes 770, 771 which cooperate with retractable members or pins 772, 773 of means 77 (FIG. 6B) as explained above.

The interface 31 can include means to interact with an identifier of the filter module. For example, the interface 31 includes electrical contacts to contact an electric identifier of the filter module 10, or a plurality of electric switches, like "reed" switches, to cooperate with a magnet which is located in the filter module, at different locations depending on the characteristics of the filter module.

Figure 10C:
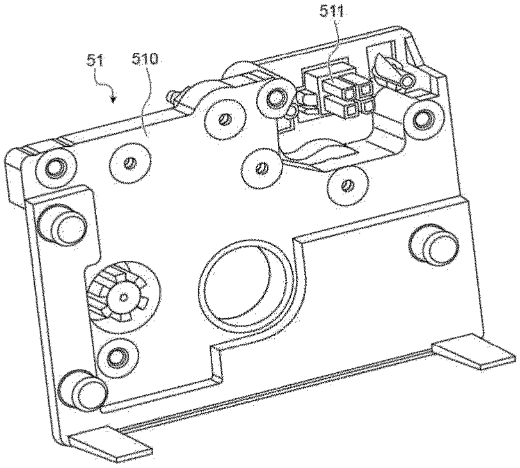

FIG. 10C is an example of interface 51 which includes a substantially flat surface 510 and inlet(s)/outlet(s) 59', 61', 63' corresponding to the outlet/inlet(s) of module 50. The other side of interface 51, not visible on this figure, has inlet(s)/outlet(s) corresponding to the outlet/inlet(s) of the part of the circuit connected to the module 51 (see FIG. 4).

Each of the interfaces includes the appropriate ducts to connect its fluid inlet(s) and outlet(s). In particular, when several possible alternative modules can be connected on the same interface, the interface includes the ducts (fluid inlets and/or outlets) and/or electrical contacts to be compatible with the several modules.

For example, interface 51 has several inlets/outlets in order to be able to connect either the recovery module of FIG. 7A or the recovery module of FIG. 7B.

The module of FIG. 7A has inlets 55, 59 which are not used, the fluid entering this module through either inlet 55 or inlet 61 and leaving the module through outlet 63; the module of FIG. 7B has 3 inlets 55, 59, 61 which are all used, the fluid entering this module by any of them, and leaving the module by outlet 57 or 63.

The same applies to the other interfaces which are for connecting any of the other single block assemblies: thus, any interface preferably contains all necessary inlets/outlets and/or electrical contact(s) and/or magnetic means, so that any version or technically updated first, resp. second, resp. third. single block assembly can be connected to interface 11, resp.31, resp.51.

FIG. 10C also shows electric connections 511 to connect the electrical contacts 51 of an electric identifier (see FIG. 7E). In a variant, as explained above, an identifier can include means, for example one or more electrical switch (es), for example one or more "reed switch(es)", located in the ink circuit, for example in the interface, and which can be operated by a magnetic field generated by one or more magnet(s) located in the module.

Figure 10D:
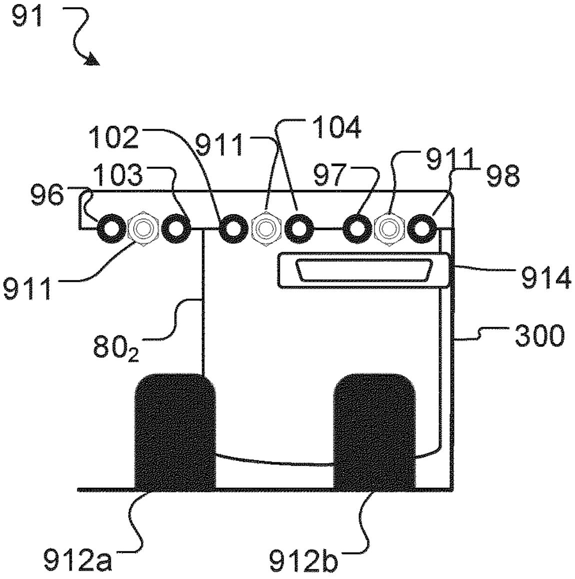

FIG. 10D shows an example interface 91 to connect multifunctional hydraulic module 90 to the printer. Interface 91 includes orifices 911, electronic port 914 and a set of inlets and outlets 96, 97, 98, 102, 103, and 104.

Interface 91 provides a convenient way to establish the hydraulic and electronic connections of hydraulic module 90 to the printer.

The set of inlets and outlets corresponding to the set of inlets and outlets 96, 97, 98, 102, 103, and 104 of module 90 hydraulically connect module 90 to the rest of the ink circuit.

An electronic port 914 connects connector 974 of the connector board 972 of module 90 to the electronic part of the CIJ printer.

For example, module 90 can be assembled to interface 91 thanks to the set of bolts 901 of module 90 shown in FIG. 8B that are fastened into orifices 911. Bolts 901 can be secured for example, using a hex wrench. For instance, a three millimeter hex wrench can be used.

Two guides 912*a*, 912*b* are also built inside the cabinet 1 to slidably receive corresponding recesses of housing 105 of module 90 and help accommodate the module 90 in the chassis 300. When module 90 is in place, it cooperates with chassis 300 to separate the front and rear parts of the cabinet 1. For instance, when module 90 is in place, module 90 blocks access to the lower compartment $80_2$ of the ink reservoir 80 from the front part of the cabinet 1.

CIJ printers use solvents that are very volatile. It is desirable that the CIJ printer is configured to reduce solvent emissions to the environment during the operation of the printer.

Figure 11:
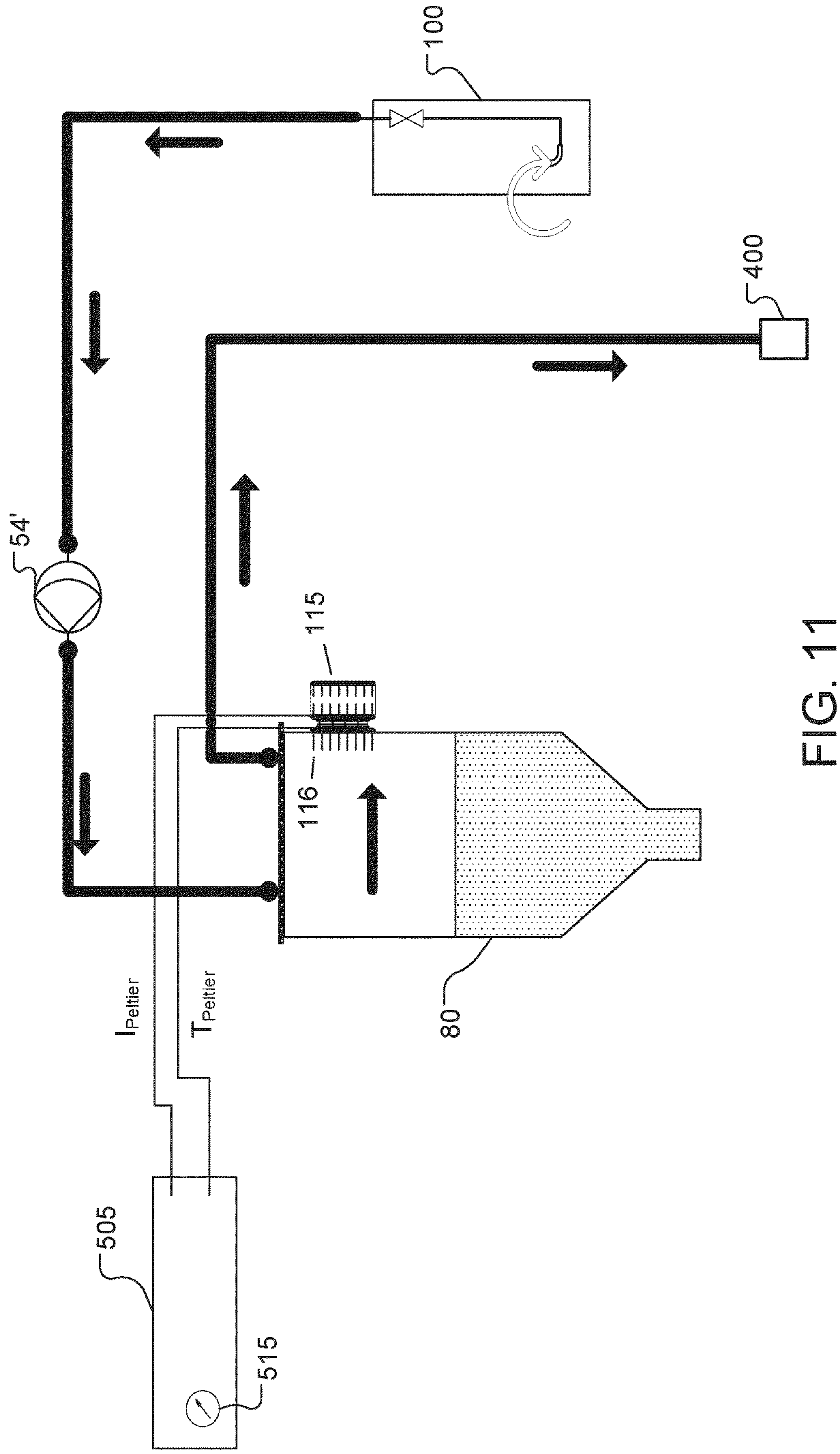
FIG. 11 shows an example of a solvent emission reduction operation for a CIJ printer.

As shown in FIG. 11, air can enter the system through the gutter that recovers the ink in the printhead 100. This air contains an amount of water vapor corresponding to the ambient relative humidity (RH). The air mixes with the ink and becomes saturated with solvent vapor. After traversing the vacuum pump 54', this mixture enters the ink reservoir 80. The air in the ink reservoir 80 is saturated with solvent.

An approach to reduce solvent emissions to the environment is to condense solvent vapor before it exits the system through the printer exhaust 400. For instance, a condenser can be used to condense the solvent vapor. For instance, a Peltier cell 115 can be used. A cold surface of the Peltier cell 115 can condense the solvent vapor to transform it back to liquid form. The solvent in liquid form drops back into the ink of the ink reservoir 80. However, during this process, water vapor also condenses. Introducing excess water in the ink dilutes the ink and can alter its quality. In order to avoid this, the Peltier cell 115 can operate in a conservative manner to ensure operation above the limit when water condensation occurs. However, this would reduce the amount of solvent condensation too.

In an advantageous embodiment, the printer is configured to maximize solvent condensation while avoiding water condensation as much as possible.

In order to do that, the condenser 115 can be configured to operate at temperatures above the dew point. The dew point is the temperature at which, for a certain vapor pressure, air is saturated with water vapor.

Figure 12:
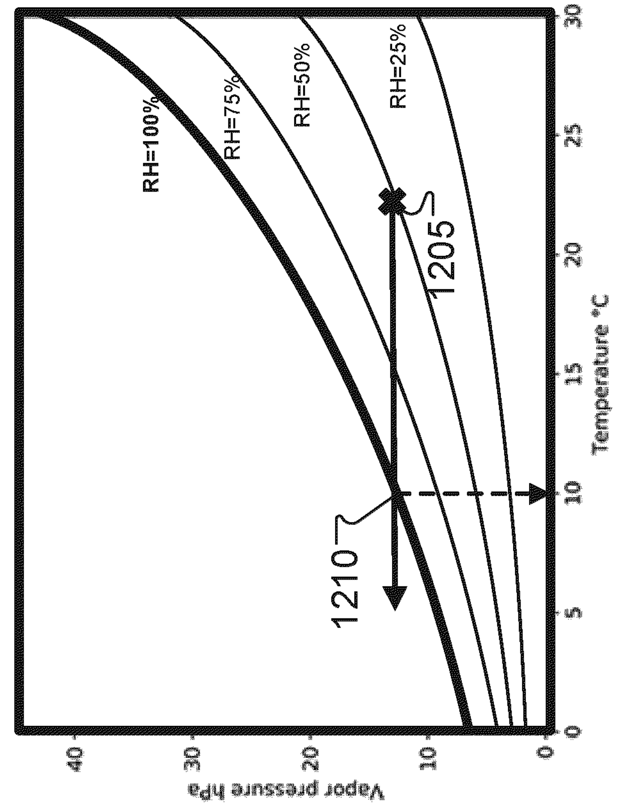
FIG. 12 shows the relation between water vapor pressure and temperature at different relative humidities.

FIG. 12 shows the relation between water vapor pressure and temperature at different relative humidities. As shown in FIG. 12, if the initial conditions correspond to a point 1205 having a certain temperature and relative humidity (RH) and air is cooled down at a constant water vapor pressure as represented by the horizontal arrow, a point 1210 is reached where the air is saturated with water, that is, the relative humidity is 100%. When this point is reached, the air cannot hold more water in gas form and, if the temperature is reduced below this point, water vapor will condense and become liquid.

To ensure that the condenser 115 operates above the dew point, a closed-loop system can be set up. For instance, a temperature sensor 116 can be included in the cabinet. For instance, the temperature sensors 116 can be integrated with the condenser 115. For instance, the temperature sensor can be a negative temperature coefficient (NTC) sensor that is glued to the cold face of the Peltier cell 115. The temperature signal can be processed at an electronic board 505 in the upper part of the cabinet and used by the controller 500 of the printer. For instance, a hygrometer 515 can also be integrated in the electronic board 505. Advantageously, the housing of the connection board 515 receives ventilation air flow from the outside, which allows the hygrometer 515 to return a humidity value close to the ambient humidity. Additionally or alternatively, the hygrometer 515 can be integrated in the printhead 100. For instance, the hygrometer 515 can be installed in the gutter area of the printhead. Placing the hygrometer 515 close to the entrance point of the air in the printhead may provide a more accurate measurement of the relative humidity of the air entering the printer. This configuration may be particularly advantageous if the printhead and the cabinet are placed in different locations where ambient conditions may differ.

With these measurements, the dew point under the current conditions can be determined by the controller 500. For instance, the dew point can be approximated using the Magnus formula that calculates the dew point as a function of the air temperature and the ambient relative humidity. Alternatively, more simple approximations can be used. More accurate approximations such as the Arden Buck equation or other similar equations can also be used to determine the dew point.

The printer can implement one or more of these formulas to determine the dew point as a function of received temperature and humidity values. Precomputed dew point values can also be stored in a lookup table in a database in the printer, with the table providing the dew point for a certain range of temperatures and relative humidities. The printer can for instance perform an interpolation to obtain the dew point for intermediate values of the temperature and/or the relative humidity.

The printer can operate in a closed-loop continuously monitoring the temperature of the cold face of the Peltier cell 115 and the ambient humidity and transmitting these values to the electronic board 505. The controller 500 can then calculate the current dew point using the above-mentioned formulas or consulting the lookup table to determine the dew point value for stored temperature and relative humidity conditions that are closest to the current conditions. The controller 500 of the printer can set the electric current in the Peltier cell to a value such that the temperature of the Peltier cell does not drop below the dew point. For instance, the temperature can be set as low as possible but still above the dew point. In this manner, the printer can avoid water condensation while maximizing solvent condensation. The air that leaves the printer through the printer exhaust 400 thus contains a minimum amount of solvent.

In another example, the multicomponent nature of the gas mixture (solvent in vapor form and water vapor) in the ink reservoir can be taken into account to determine the Peltier cell temperature and electrical current. For instance, the ratio of solvent and water vapor in the ink reservoir can be used in the calculation. For instance, physical and/or chemical characteristics of the particular solvent can be used in the calculation. For instance, the saturation vapor pressure of the solvent can be taken into account in the determination of the temperature.

For instance, a saturation vapor pressure for each solvent that the printer may use can be stored in the printer in an ink database for a range of ambient conditions. For instance, when a solvent cartridge is placed in the printer, the RFID antenna 107*a* of the hydraulic module 90 can read the identification data of the solvent and retrieve the relevant data from the database, such as the saturation vapor pressure of the solvent. An equation that determines the temperature at which the Peltier cell needs to be set up as a function of the saturation vapor pressure of the particular solvent can also be stored in the printer. Additionally or alternatively, a lookup table can be used as above. The printer can operate in a closed-loop in the same manner as above, monitoring the temperature and relative humidity and setting the electric current in the Peltier cell such that the temperature in the ink reservoir is set at the optimum temperature.

What is claimed is:

1. A continuous inkjet printer comprising:

a cabinet having a first side and a second side different from the first side;

components of an ink circuit of the continuous inkjet printer that are to be accessed by a printer technician being located in and accessible from the first side of the cabinet; and components of the ink circuit of the continuous inkjet printer that are to be accessed by a printer user being located in and accessible from the second side of the cabinet different from the first side, wherein the components of the continuous inkjet printer that are located in and accessible from the second side of the cabinet different from the first side comprise two or more single-block or whole-block removable assemblies that are separate from each other and independently removable, wherein the two or more single-block or whole-block removable assemblies comprise modules selected from an ink pump module, a filter module, and an ink recovery module.

2. The continuous inkjet printer of claim 1, wherein the two or more single-block or whole-block removable assemblies comprise the ink pump module, the filter module, and the ink recovery module.

3. The continuous inkjet printer of claim 2, wherein the two or more single-block or whole-block removable assemblies further comprise a multifunctional hydraulic module, wherein the components of the ink circuit of the continuous inkjet printer that are located in the first side of the cabinet comprise a main ink reservoir, and wherein each of the two or more single-block or whole-block removable assemblies is removable using a single type of tool.

4. The continuous inkjet printer of claim 2, wherein the components of the continuous inkjet printer that are located in the second side of the cabinet further comprise an ink cartridge and a solvent cartridge, and wherein the continuous inkjet printer comprises a user interface display device, and a controller configured to notify a user of a needed maintenance task for at least one of the components located in the second side of the cabinet, and present on the user interface display device instructions to the user showing how to perform the needed maintenance task.

5. The continuous inkjet printer of claim 4, wherein each of the components of the continuous inkjet printer that are located in the second side of the cabinet comprise an identifier, and wherein the controller is configured to confirm an identity and compatibility of a component based on information obtained from the identifier of the component.

6. The continuous inkjet printer of claim 2, wherein the second side of the cabinet is a front side of the cabinet, and the first side of the cabinet is a back side of the cabinet.

7. The continuous inkjet printer of claim 2, comprising:

a first damper positioned along the ink circuit of the continuous inkjet printer; and a removable filter module comprising a second damper positioned along the ink circuit of the continuous inkjet printer;

wherein the first damper is external to the removable filter module, and the first and second dampers are selected to cooperate with each other to damp pressure variations of ink in the ink circuit during operation of the continuous inkjet printer.

8. The continuous inkjet printer of claim 7, wherein the removable filter module comprises a single-block or whole-block removable assembly forming a component located in the second side of the continuous inkjet printer.

9. The continuous inkjet printer of claim 8, wherein the removable filter module comprises a first filter and a second filter contained in a housing of the removable filter module, and wherein the second damper is a floating damper placed above the first filter, and the floating damper is held in place between the first filter and an interior surface of the housing of the removable filter module.

10. The continuous inkjet printer of claim 9, wherein the second filter is a grid filter, the first filter is a main filter, and the removable filter module comprises a third filter connected between an outlet of the main filter and a fluid outlet of the removable filter module.

11. The continuous inkjet printer of claim 9, wherein the first damper is placed on a main pressure line of the ink circuit, and the second damper is placed on a jet generation line of the ink circuit.

12. The continuous inkjet printer of claim 1, comprising a removable hydraulic module comprising two or more components of the continuous inkjet printer that are most active during operation of the continuous inkjet printer and thus tend to wear out before other components of the continuous inkjet printer.

13. The continuous inkjet printer of claim 12, wherein the removable hydraulic module comprises a retention tank or tray configured and arranged to collect liquid leaks.

14. A continuous inkjet printer comprising:

a cabinet having a first side and a second side;

components of an ink circuit of the continuous inkjet printer that are to be accessed by a printer technician being located in and accessible from the first side of the cabinet; and components of the continuous inkjet printer that are to be accessed by a printer user being located in the second side of the cabinet, wherein the components of the continuous inkjet printer that are located in the second side of the cabinet comprise one or more single-block or whole-block removable assemblies, wherein the one or more single-block or whole-block removable assemblies comprise an ink pump module, a filter module, or an ink recovery module, the continuous inkjet printer comprising a removable hydraulic module comprising two or more components of the continuous inkjet printer that are most active during operation of the continuous inkjet printer and thus tend to wear out before other components of the continuous inkjet printer, wherein the two or more components comprise:

a first pump for pumping ink from an ink source;

a second pump for pumping solvent from a solvent source; and two or more valves configured and arranged to connect the first and second pumps with inlets and outlets of the removable hydraulic module to establish fluidic connection in the ink circuit of the continuous inkjet printer.

15. The continuous inkjet printer of claim 14, wherein the removable hydraulic module comprises a retention tank or tray configured and arranged to collect liquid leaks.

16. The continuous inkjet printer of claim 15, wherein the retention tank or tray is integrally formed into a housing of the removable hydraulic module and extends beneath each of the ink source and the solvent source when the removable hydraulic module is coupled with the continuous inkjet printer.

17. The continuous inkjet printer of claim 16, wherein the two or more valves comprise five electrovalves, and the removable hydraulic module comprises:

a hydraulic manifold configured and arranged to connect hydraulic components of the removable hydraulic module in a compact manner; and a pressure sensor connected to the hydraulic manifold.

18. The continuous inkjet printer of claim 14, wherein the two or more valves comprise five electrovalves, and the removable hydraulic module comprises:

a hydraulic manifold configured and arranged to connect hydraulic components of the removable hydraulic module in a compact manner; and a pressure sensor connected to the hydraulic manifold.

19. The continuous inkjet printer of claim 1, comprising:

a temperature sensor;

a hygrometry sensor;

a condenser; and a controller configured to set a lower temperature limit for the condenser to maximize condensation of solvent vapor from a solvent currently being used in the continuous inkjet printer, while minimizing condensation of water vapor, wherein the lower temperature limit is set based on a temperature value measured by the temperature sensor and a humidity value measured by the hygrometry sensor.

20. The continuous inkjet printer of claim 1, wherein the first side is opposite to the second side.

* * * * *